US012172445B2

(12) United States Patent
Hayashi

(10) Patent No.: US 12,172,445 B2
(45) Date of Patent: Dec. 24, 2024

(54) PRINTER AND ABSORPTION BODY

(71) Applicant: BROTHER KOGYO KABUSHIKI KAISHA, Nagoya (JP)

(72) Inventor: Kakeru Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 25 days.

(21) Appl. No.: 17/703,246

(22) Filed: Mar. 24, 2022

(65) Prior Publication Data

US 2022/0379617 A1 Dec. 1, 2022

(30) Foreign Application Priority Data

May 31, 2021 (JP) ................................ 2021-091965

(51) Int. Cl.
*B41J 2/165* (2006.01)

(52) U.S. Cl.
CPC ................................ *B41J 2/16505* (2013.01)

(58) Field of Classification Search
CPC ................ B41J 2/16505; B41J 2/16541; B41J 2/16547; B41J 2/16552; B41J 2/16538; B41J 2/1714; B41J 29/02; B41J 29/13; B41J 2/16508; B41J 2/2117
See application file for complete search history.

(56) References Cited

U.S. PATENT DOCUMENTS 9,604,461 B2 * 3/2017 Kobayashi ........... B41J 2/16508
2012/0113179 A1 * 5/2012 Higuchi ................ B41J 11/706
347/16

FOREIGN PATENT DOCUMENTS

JP 2002205415 A 7/2002
JP 2011218582 A * 11/2011 .......... B41J 2/16505

* cited by examiner

*Primary Examiner* — Sharon Polk
(74) *Attorney, Agent, or Firm* — K&L Gates LLP

(57) ABSTRACT

A printer that includes a platen, a head, a support plate, and an absorption body. A print medium is placed on the platen. The head includes a nozzle surface and is configured to discharge ink, in a discharge direction, from the nozzle surface. The support plate is configured to support the head. The absorption body is provided on the discharge direction of the support plate. The absorption body is exposed to the platen and is configured to absorb liquid.

17 Claims, 21 Drawing Sheets

PRINTER AND ABSORPTION BODY

CROSS-REFERENCE TO RELATED APPLICATIONS

This application claims priority to Japanese Patent Application No. 2021-091965, filed May 31, 2021. The disclosure of the foregoing application is incorporated herein by reference in its entirety.

BACKGROUND

The present disclosure relates to a printer and an absorption body provided in the printer.

A printer is provided with a discharge head, a carriage, and a platen portion. The discharge head is mounted to the carriage. The carriage moves in a reciprocating manner over a sheet of paper supported on the platen portion. As a result of the discharge head discharging ink when the carriage is moving in the reciprocating manner, the printer performs printing.

SUMMARY

In the printer, there is a possibility that some of the ink discharged by the discharge head may become a mist. There is a possibility that the mist may become attached to the carriage. The mist that has attached to the carriage develops into droplets. There is a possibility that the droplets may fall onto a print medium supported by the platen portion, and may contaminate the print medium.

An object of the present disclosure is to provide a printer and an absorption body provided in the printer, which can reduce a possibility of droplets falling and contaminating a print medium.

Various embodiments herein provide a printer that includes a platen, a head, a support plate, and an absorption body. A print medium is placed on the platen. The head includes a nozzle surface and is configured to discharge ink, in a discharge direction, from the nozzle surface. The support plate is configured to support the head. The absorption body is provided on the discharge direction of the support plate. The absorption body is exposed to the platen and is configured to absorb liquid.

According to the first aspect, the absorption body is provided at the support plate. The absorption body is exposed to the platen. Using the absorption body, the printer can reduce a possibility of the liquid falling onto the print medium placed on the platen. Thus, the printer can reduce a possibility of the print medium becoming contaminated.

Various embodiments also provide an absorption body that is provided in a printer. The printer includes a platen, a head, and a support plate. A print medium is placed on the platen. The head includes a nozzle surface and discharges ink in a discharge direction from the nozzle surface. The support plate supports the head. The absorption body is provided on the discharge direction of the support plate. The absorption body is exposed to the platen and is configured to absorb liquid.

The absorption body can reduce a possibility of the liquid falling onto the print medium. Thus, the absorption body can reduce a possibility of the print medium becoming contaminated.

BRIEF DESCRIPTION OF THE DRAWINGS

Embodiments of the disclosure will be described below in detail with reference to the accompanying drawings in which.

DETAILED DESCRIPTION

Figure 1:
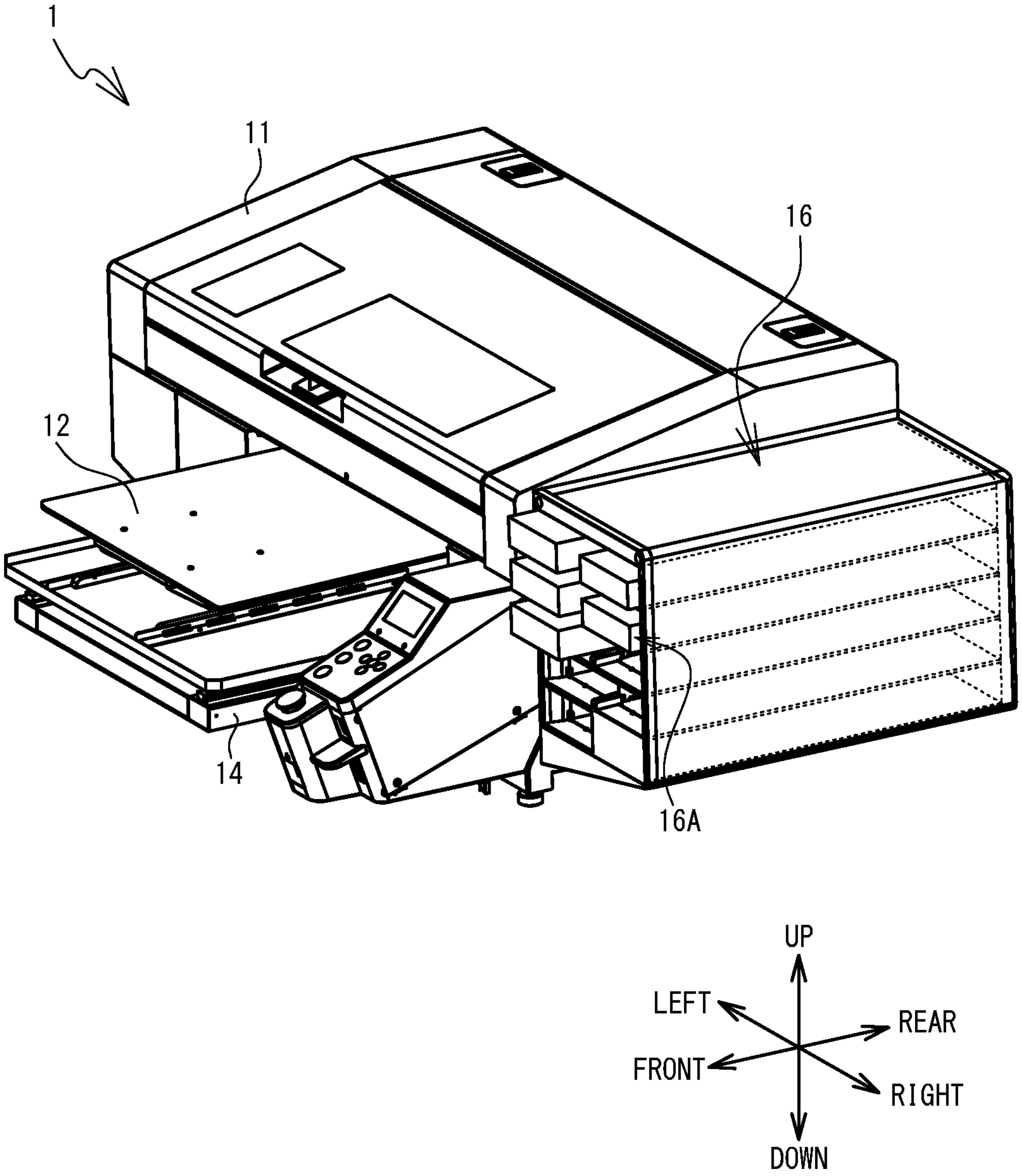
FIG. 1 is a perspective view of a printer.

A printer 1 according to the present disclosure will be described. The upper side, the lower side, the lower left side, the upper right side, the lower right side, and the upper left side in FIG. 1 are, respectively, an upper side, a lower side, a front side, a rear side, a right side, and a left side of the printer 1. Note that mechanical elements of the present embodiment represented in the drawings indicate an actual scale.

Overview of Printer 1

The printer 1 is an inkjet printer that discharges a liquid and performs printing on a print medium, which is a cloth such as a T-shirt, paper, or the like. The printer 1 prints a color image on the print medium, for example, by discharging, downward, five different types of ink (white, black, yellow, cyan, and magenta), which are the liquid.

In the following description, of the five colors of ink, the white-colored ink is referred to as "white ink." Of the five colors of ink, when the four colors of black, cyan, yellow, and magenta ink are collectively referred to, or when one specific color is not specified, they are referred to as "color inks." When the white ink and the color inks are collectively referred to, or when one specific color is not specified, they are referred to simply as "ink" or "inks." The white ink is used in printing as a portion representing white color in an image, or as a base for the color inks. The color inks are discharged directly onto the print medium, or are discharged onto the base formed by the white ink. The color inks are used in printing a color image.

As illustrated in FIG. 1, the printer 1 is provided with a housing 11, a platen 12, a platen drive mechanism 14, a mounting portion 16, and the like. The housing 11 is a cuboid shape and the front surface thereof includes an opening. Hereinafter, a region that is inside the housing 11 is referred to as a region inside the printer 1. A region that is outside the housing 11 is referred to as a region outside the printer 1.

A sub-scanning drive portion (not illustrated) is built into the platen drive mechanism 14. The sub-scanning drive portion moves the platen 12 using driving of a platen motor (not illustrated). The platen 12 is a plate shape that is rectangular in a plan view. The print medium is placed on the upper surface of the platen 12. The mounting portion 16 is provided at the right of the housing 11. Cartridges 16A are connected to the mounting portion 16. A liquid stored in the cartridges 16A is supplied to heads 31 and 32 to be described later.

Figure 2:
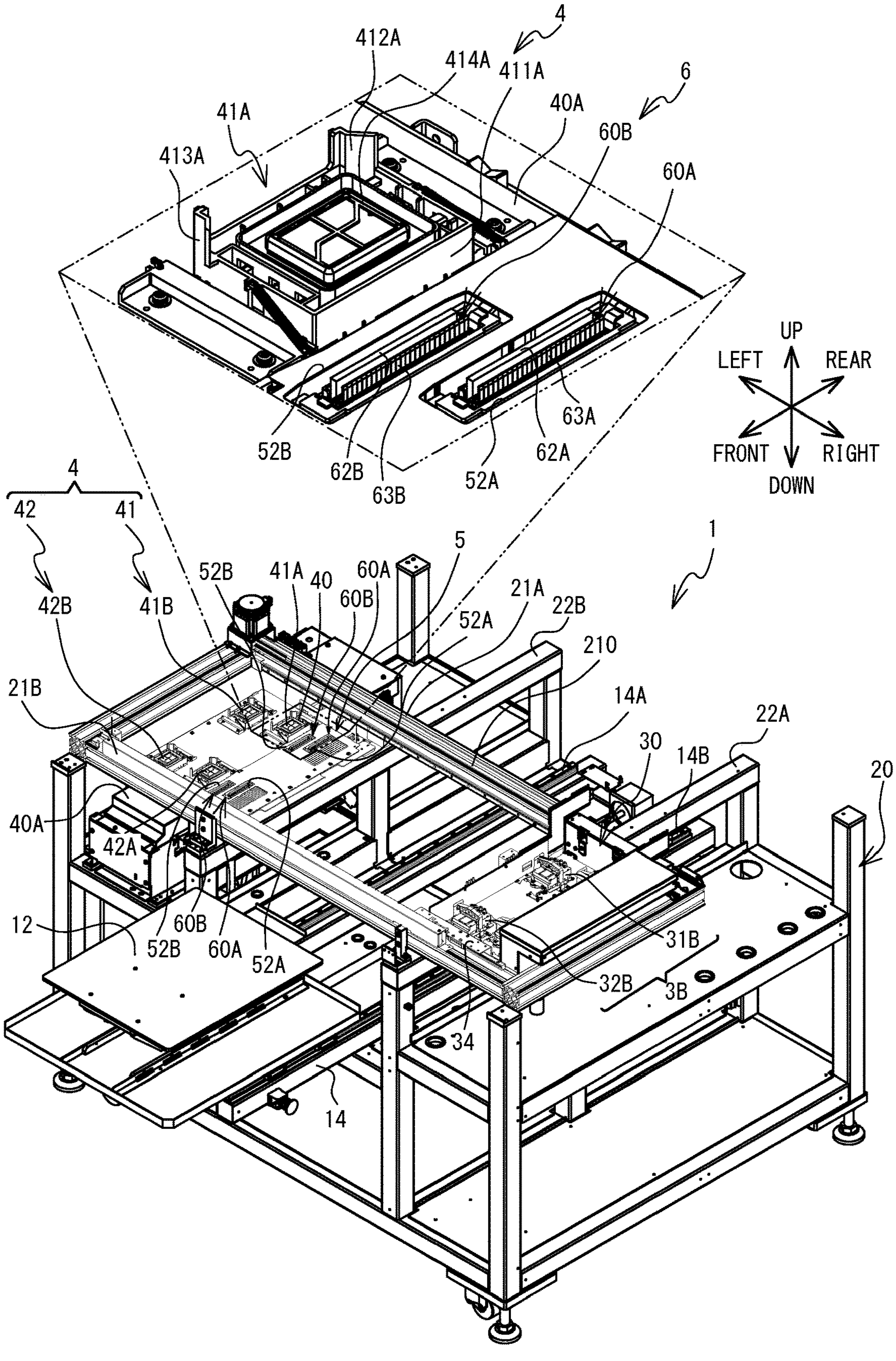
FIG. 2 is a perspective view illustrating an interior configuration of the printer.

As illustrated in FIG. 2, a frame body 20, guide shafts 21A and 21B, a carriage 30, a cap mechanism 40, and a cleaning assembly 5 are provided inside the housing 11 (refer to FIG. 1). The frame body 20 is a lattice-shaped structural body. The guide shafts 21A and 21B are supported on the upper ends of the frame body 20. The platen drive mechanism 14 is supported at the center, in the left-right direction, of the frame body 20. The frame body 20 supports the platen drive mechanism 14 at a position lower than the guide shafts 21A and 21B, in the up-down direction.

Figure 3:
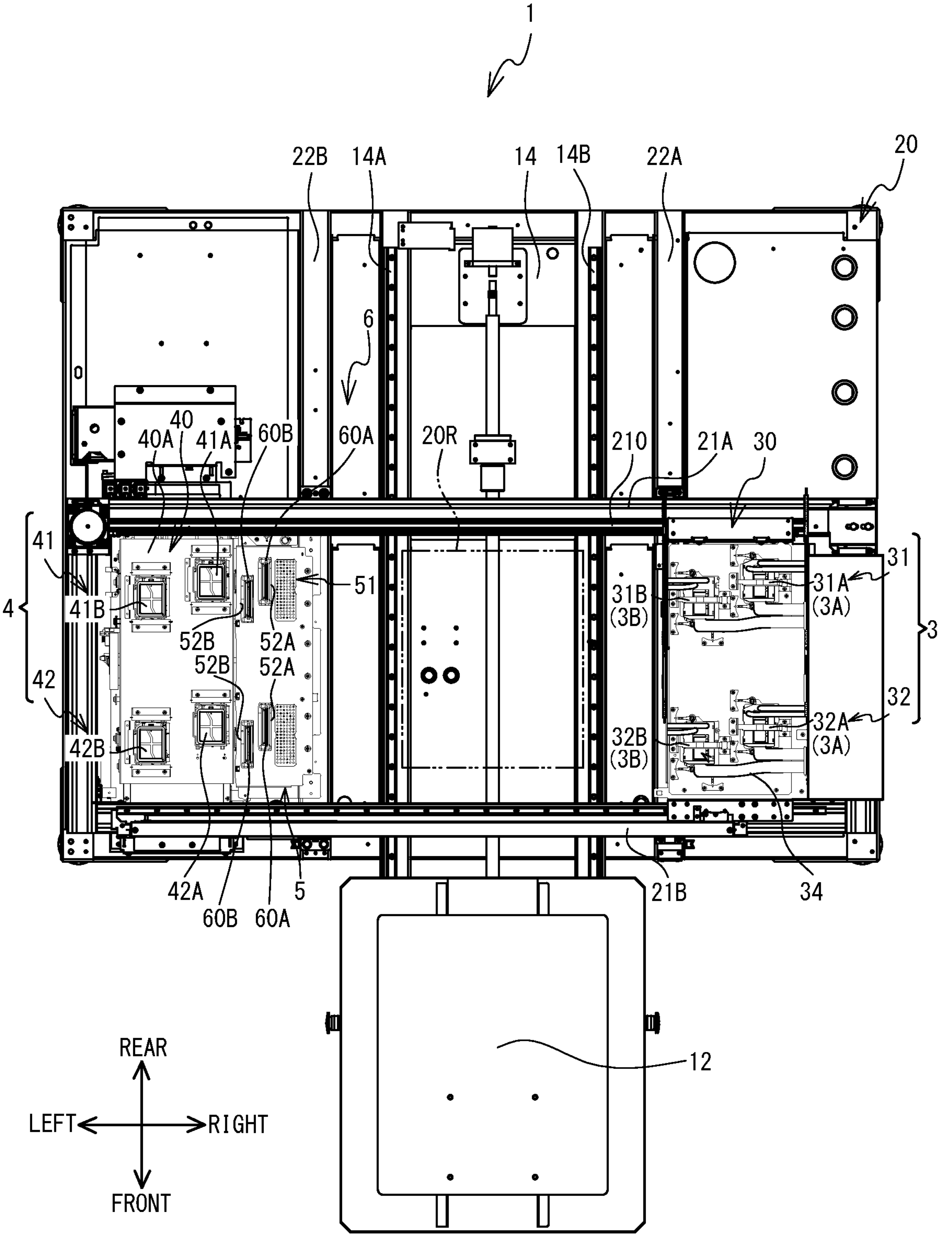
FIG. 3 is a plan view illustrating the interior configuration of the printer.

The guide shafts 21A and 21B extend in the left-right direction. The guide shafts 21A and 21B are arranged in parallel to each other with an interval therebetween in the front-rear direction. The guide shafts 21A and 21B support the carriage 30 such that the carriage 30 is movable in the left-right direction (hereinafter also referred to as a main scanning direction). FIG. 2 and FIG. 3 illustrate a state in which the carriage 30 has moved to a right end. The carriage 30 includes the heads 31 and 32 (refer to FIG. 3, hereinafter collectively referred to as heads 3 when no distinction is made therebetween) that discharge the ink. In the present embodiment, the heads 3 include a piezoelectric element. The heads 3 may include a heater, in place of the piezoelectric element, as a mechanism that discharges the ink. A drive belt 210 is provided along the guide shaft 21A. The drive belt 210 moves in the main scanning direction due to driving of a main scanning motor (not illustrated). The carriage 30 is coupled to the drive belt 210. The carriage 30 is moved in the main scanning direction by the drive belt 210. A region sandwiched, from the front and rear directions, between the guide shafts 21A and 21B corresponds to a movement path of the carriage 30.

The platen drive mechanism 14 includes guide rails 14A and 14B at the upper surface thereof. The guide rails 14A and 14B extend in the front-rear direction. The guide rails 14A and 14B are arranged in parallel to each other with an interval therebetween in the left-right direction. The guide rails 14A and 14B support the platen 12 such that the platen 12 is movable in the front-rear direction (hereinafter also referred to as a sub-scanning direction). A region positioned between the guide rails 14A and 14B in the left-right direction corresponds to a movement path of the platen 12. The platen 12 is moved in the front-rear direction with respect to the carriage 30 by the driving of the platen motor.

As illustrated in FIG. 3, the platen 12 moves along the guide rails 14A and 14B. The carriage 30 moves along the guide shafts 21A and 21B. The movement path of the platen 12 intersects, in the front-rear direction, the movement path of the carriage 30, below a central portion, in the main scanning direction, of the movement path of the carriage 30. Hereinafter, a region in which the movement path of the platen 12 intersects the movement path of the carriage 30 in the up-down direction is referred to as a printing region 20R. The printing region 20R is positioned at the center of the region inside the printer 1, in the left-right direction.

The frame body 20 is provided with frames 22A and 22B. The frames 22A and 22B extend in the front-rear direction. The frames 22A and 22B are disposed below the guide shafts 21A and 21B. The frame 22A is disposed to the right of the printing region 20R. The frame 22B is disposed to the left of the printing region 20R. The cap mechanism 40 and the cleaning assembly 5 are provided to the left of the frame 22B and below the movement path of the carriage 30. The cap mechanism 40 is disposed to the left of the cleaning assembly 5.

The printer 1 moves the carriage 30 in the main scanning direction in a reciprocating manner, while moving the print medium placed on the platen 12, in the sub-scanning direction. At this time, by discharging the ink from the heads 3 onto the print medium placed on the platen 12 that is at the printing region 20R, the printing on the print medium is performed.

Carriage 30

As illustrated in FIG. 3, the carriage 30 includes the heads 31 and 32, and a support plate 34. The heads 31 and 32 are each supported by the support plate 34. A detailed description of the support plate 34 will be given below. The head 31 includes a first head 31A and a second head 31B that have a common structure. The first head 31A is disposed to the right of the second head 31B, with an interval therebetween.

Figure 4:
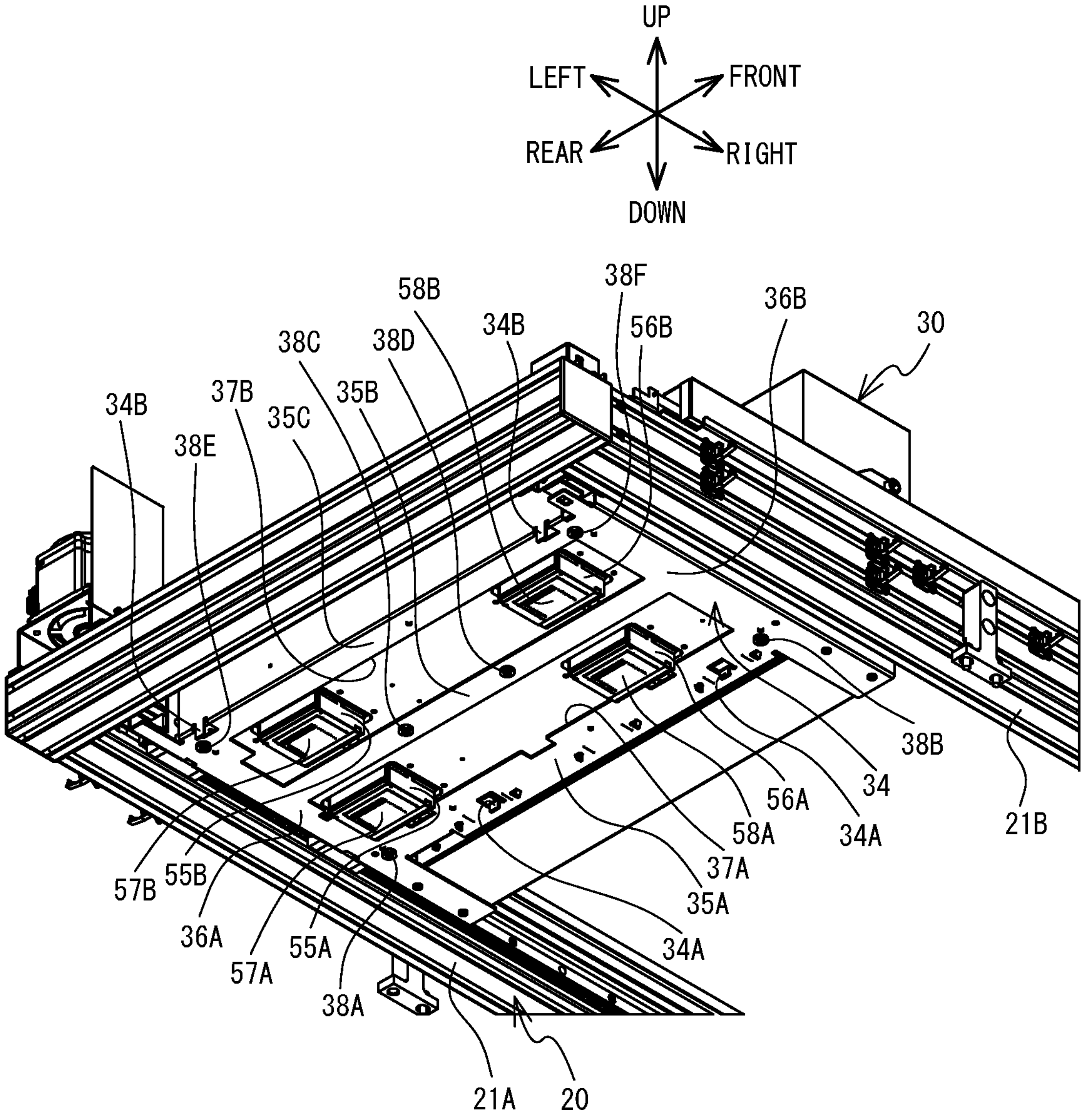
FIG. 4 is a perspective view of a carriage in a state in which an absorption fixture is not attached.

As illustrated in FIG. 4, the first head 31A includes a protrusion 55A. The second head 31B includes a protrusion 55B. The protrusions 55A and 55B protrude further downward than the support plate 34. The shape of each of the protrusions 55A and 55B is a cuboid body. A nozzle surface 57A is formed at the lower surface of the protrusion 55A. A nozzle surface 57B is formed at the lower surface of the protrusion 55B. The positions of the nozzle surfaces 57A and 57B are respectively aligned in the up-down direction. A plurality of nozzles (not illustrated) are provided in each of the nozzle surfaces 57A and 57B. The plurality of nozzles are openings. The plurality of nozzles discharge the ink downward.

As illustrated in FIG. 3, the head 32 includes a first head 32A and a second head 32B. The first head 32A is disposed to the front of the first head 31A. The second head 32B is disposed to the front of the second head 31B. The first head 32A is disposed to the right of the second head 32B, with an interval therebetween.

As illustrated in FIG. 4, the first head 32A includes a protrusion 56A. The second head 32B includes a protrusion 56B. The protrusions 56A and 56B protrude further downward than the support plate 34. The shape of each of the protrusions 56A and 56B is a cuboid body. A nozzle surface 58A is formed at the lower surface of the protrusion 56A. A nozzle surface 58B is formed at the lower surface of the protrusion 56B. The positions, in the up-down direction of the nozzle surfaces 58A and 58B are aligned with the positions, in the up-down direction, of the nozzle surfaces 57A and 57B. A plurality of nozzles (not illustrated) are provided in each of the nozzle surfaces 58A and 58B. The plurality of nozzles are openings. The plurality of nozzles discharge the ink downward. As illustrated in FIG. 3, when no distinction is made between the first heads 31A and 32A, they are collectively referred to as first heads 3A. When no distinction is made between the second heads 31B and 32B, they are collectively referred to as second heads 3B.

Cap Mechanism 40

As illustrated in FIG. 3, the cap mechanism 40 includes caps 41 and 42 that cover the heads 3. Hereinafter, when no distinction is made between the caps 41 and 42, they are referred to as caps 4. The cap mechanism 40 includes a support portion 40A that supports the caps 4. The support portion 40A is moved up and down by a cap drive portion (not illustrated). The cap 41 includes a first cap 41A and a second cap 41B. The cap 42 includes a first cap 42A and a second cap 42B.

As illustrated in FIG. 2, the first cap 41A includes a frame body 411A and a covering portion 414A. The frame body 411A is an angular cylindrical shape. The upper end and lower end of the frame body 411A are open. In a plan view, a size of the inside the frame body 411A is the same as the size of the protrusion 55A (refer to FIG. 4). The frame body 411A includes protrusions 412A and 413A. The protrusion 412A is a rear left end portion of the frame body 411A. The protrusion 413A is a front left end portion of the frame body 411A. The upper ends of the protrusions 412A and 413A are positioned higher than the end portion of the covering portion 414A in the up-down direction. The upper end of the frame body 411A other than the protrusions 412A and 413A is positioned lower than the upper end of the covering portion 414A in the up-down direction. The covering portion 414A is housed inside the frame body 411A. The upper end and the lower end of the covering portion 414A are open. In a plan view, the size of the inside of the covering portion 414A is the same as the size of the nozzle surface 57A (refer to FIG. 4). The structures of the second cap 41B, the first cap 42A, and the second cap 42B are the same as that of the first cap 41A.

In a state in which the carriage 30 has moved to the left end of the movement path, the first cap 41A is positioned below the first head 31A. The second cap 41B is positioned below the second head 31B. The first cap 42A is positioned below the first head 32A. The second cap 42B is positioned below the second head 32B. Hereinafter, the position of the carriage 30 that has moved to the left end of the movement path is referred to as a first reference position.

Cleaning Assembly 5

As illustrated in FIG. 3, the cleaning assembly 5 is positioned between the cap mechanism 40 and the frame 22B in the main scanning direction. The cleaning assembly 5 includes a cleaning fluid vessel 51, and a wipe mechanism 6. The cleaning fluid vessel 51 stores a cleaning fluid. The cleaning fluid vessel 51 is box shaped. Openings 52A and 52B are provided in the upper portion of the cleaning fluid vessel 51.

Wipe Mechanism 6

As illustrated in FIG. 2, the wipe mechanism 6 includes two first wipers 60A, and two second wipers 60B. The two first wipers 60A and the two second wipers 60B are housed in the interior of the cleaning fluid vessel 51 (refer to FIG. 14). The two first wipers 60A and the two second wipers 60B can rotate around axes extend in the left-right direction in the interior of the cleaning fluid vessel 51. The two first wipers 60A are disposed side by side in the front-rear direction with an interval therebetween. The front-side first wiper 60A wipes the nozzle surface 58A illustrated in FIG. 4. The rear-side first wiper 60A wipes the nozzle surface 57A illustrated in FIG. 4.

The two second wipers 60B are disposed side by side in the front-rear direction with an interval therebetween. The front-side second wiper 60B is provided to the front and left of the front-side first wiper 60A. The front-side second wiper 60B wipes the nozzle surface 58B illustrated in FIG. 4. The rear-side second wiper 60B is provide to the front and left of the rear-side first wiper 60A. The rear-side second wiper 60B wipes the nozzle surface 57B illustrated in FIG. 4.

As illustrated in FIG. 2, the first wipers 60A includes a first foam wiper 62A and a first rubber wiper 63A. The first foam wiper 62A has a plate shape that is long in the front-rear direction, and extends orthogonally to the left-right direction. The first foam wiper 62A is a wiper formed of a porous material, such as a resin foam or the like, and has absorbent properties. The first rubber wiper 63A is disposed to the right of the first foam wiper 62A. The first rubber wiper 63A is made of rubber.

As illustrated in FIG. 2, the second wipers 60B includes a second foam wiper 62B and a second rubber wiper 63B. The second foam wiper 62B is formed of the same material as the first foam wiper 62A, and has the same shape. The second rubber wiper 63B is formed of the same material as the first rubber wiper 63A, and has the same shape.

The first wipers 60A and the second wipers 60B move, by rotating, between a contact position and a non-contact position. As illustrated in FIG. 2, the contact position of the first wipers 60A is a position in which the first foam wiper 62A and the first rubber wiper 63A protrude upward from the opening 52A. The contact position of the second wipers 60B is a position in which the second foam wiper 62B and the second rubber wiper 63B protrude upward from the opening 52B. The non-contact position of the first wipers 60A is a position in which the first foam wiper 62A and the first rubber wiper 63A have rotated around the axis by 180° from the contact position, inside the cleaning fluid vessel 51 (refer to FIG. 14). The non-contact position of the second wipers 60B is a position in which the second foam wiper 62B and the second rubber wiper 63B have rotated around the axis by 180° from the contact position, inside the cleaning fluid vessel 51 (refer to FIG. 14). When the first wipers 60A are positioned at the non-contact position, the first foam wiper 62A and the first rubber wiper 63A do not protrude upward from the opening 52A. When the second wipers 60B are positioned at the non-contact position, the second foam wiper 62B and the second rubber wiper 63B do not protrude upward from the opening 52B. A position, in the up-down direction, of the leading ends of the first wipers 60A positioned in the contact position is the same as a position, in the up-down direction, of the leading ends of the second wipers 60B positioned in the contact position.

Support Plate 34

As illustrated in FIG. 2 to FIG. 4, the support plate 34 supports the heads 3 from below. The rear end of the support plate 34 is supported by the guide shaft 21A such that the support plate 34 can move in the main scanning direction. The front end of the support plate 34 is supported by the guide shaft 21B such that the support plate 34 can move in the main scanning direction.

The support plate 34 is formed of a non-magnetic metal, such as aluminum or the like. As illustrated in FIG. 4, the support plate 34 is provided with plate portions 35A, 35B, and 35C, and a plate portions 36A and 36B. The plate portions 35A, 35B, and 35C are flat plates that extend in the front-rear direction. The plate portions 35A, 35B, and 35C are disposed in parallel to each other with intervals therebetween in the left-right direction. The plate portion 35B is disposed to the left of the plate portion 35A. The plate portion 35C is disposed to the left of the plate portion 35B.

The plate portions 36A and 36B are flat plates that extend in the left-right direction. The plate portions 36A and 36B are disposed in parallel to each other with an interval therebetween in the front-rear direction. The plate portion 36B is disposed to the front of the plate portion 36A. The front end portion of the plate portion 36A is connected to the rear end portions of the plate portions 35A, 35B, and 35C. The rear end portion of the plate portion 36B is connected to the front end portions of the plate portions 35A, 35B, and 35C.

The support plate 34 includes holes 37A and 37B that penetrate in the up-down direction. The hole 37A is a space surrounded by the left end portion of the plate portion 35A, the right end portion of the plate portion 35B, the front end portion of the plate portion 36A, and the rear end portion of the plate portion 36B. The hole 37B is a space surrounded by the left end portion of the plate portion 35B, the right end portion of the plate portion 35C, the front end portion of the plate portion 36A, and the rear end portion of the plate portion 36B. The protrusions 55A and 56A penetrate the hole 37A. The nozzle surfaces 57A and 58A are disposed lower than the support plate 34 in the up-down direction. The protrusions 55B and 56B penetrate the hole 37B. The nozzle surfaces 57B and 58B are disposed lower than the support plate 34 in the up-down direction.

The support plate 34 is provided with magnets 38A to 38F, and positioners 34A and 34B. The magnet 38A is disposed below the plate portion 36A. The magnet 38A is disposed to the rear of the plate portion 35A. The magnet 38B is disposed below the plate portion 36B. The magnet 38B is disposed to the front of the plate portion 35A. The magnets 38A and 38B are arranged alongside each other with an interval therebetween in the front-rear direction. The magnets 38C and 38D are disposed below the plate portion 35B. The magnets 38C and 38D are disposed at a center portion of the plate portion 35B in the front-rear direction. The magnet 38D is disposed to the front of the magnet 38C. The magnet 38E is disposed below the plate portion 36A. The magnet 38E is disposed to the rear of the plate portion 35C. The magnet 38F is disposed below the plate portion 36B. The magnet 38F is disposed to the front of the plate portion 35C. The magnets 38E and 38F are disposed alongside each other with an interval therebetween in the front-rear direction.

The positioners 34A extend downward from the plate portion 35A. The number of the positioners 34A is not limited, but in the present embodiment, the number of the positioners 34A is two. The two positioners 34A are disposed alongside each other with an interval therebetween in the front-rear direction. The positions of the two positioners 34A in the left-right direction are disposed further to the right than the positions of the magnets 38A and 38B in the left-right direction.

The positioners 34B extend downward from the plate portion 35C. The number of the positioners 34B is not limited, but in the present embodiment, the number of the positioners 34B is two. The two positioners 34B are disposed alongside each other with an interval therebetween in the front-rear direction. The positions of the two positioners 34B in the left-right direction are disposed further to the left than the positions of the magnets 38E and 38F in the left-right direction. In the present embodiment, the two positioners 34B are disposed at the left end portion of the plate portion 35C. The interval in the left-right direction between the positioners 34A and the positioners 34B is equal to a size, in the left-right direction, of an absorption fixture 7 to be described later.

Absorption Fixture 7

As illustrated in 5, the absorption fixture 7 is provided downward of the support plate 34. The absorption fixture 7 is exposed to the platen 12 (refer to FIG. 1). Here, "exposed to" indicates a state in which, when the print medium is not placed, there is no obstruction between the platen 12 and the absorption fixture 7 in the up-down direction. The absorption fixture 7 is provided with a holder 71 and an absorption body 72. The holder 71 holds the absorption body 72. The holder 71 is a flat plate that extends in the front-rear direction and the left-right direction. The holder 71 is made of a magnetic metal, such as ferritic stainless steel, or the like. The absorption fixture 7 is attached to the support plate 34 as a result of the holder 71 being attracted to the magnets 38A to 38F. In contrast, the absorption fixture 7 is removed from the support plate 34 by removing the holder 71 from the magnets 38A to 38F. In other words, the absorption fixture 7 is detachably provided on the support plate 34.

Figure 6:
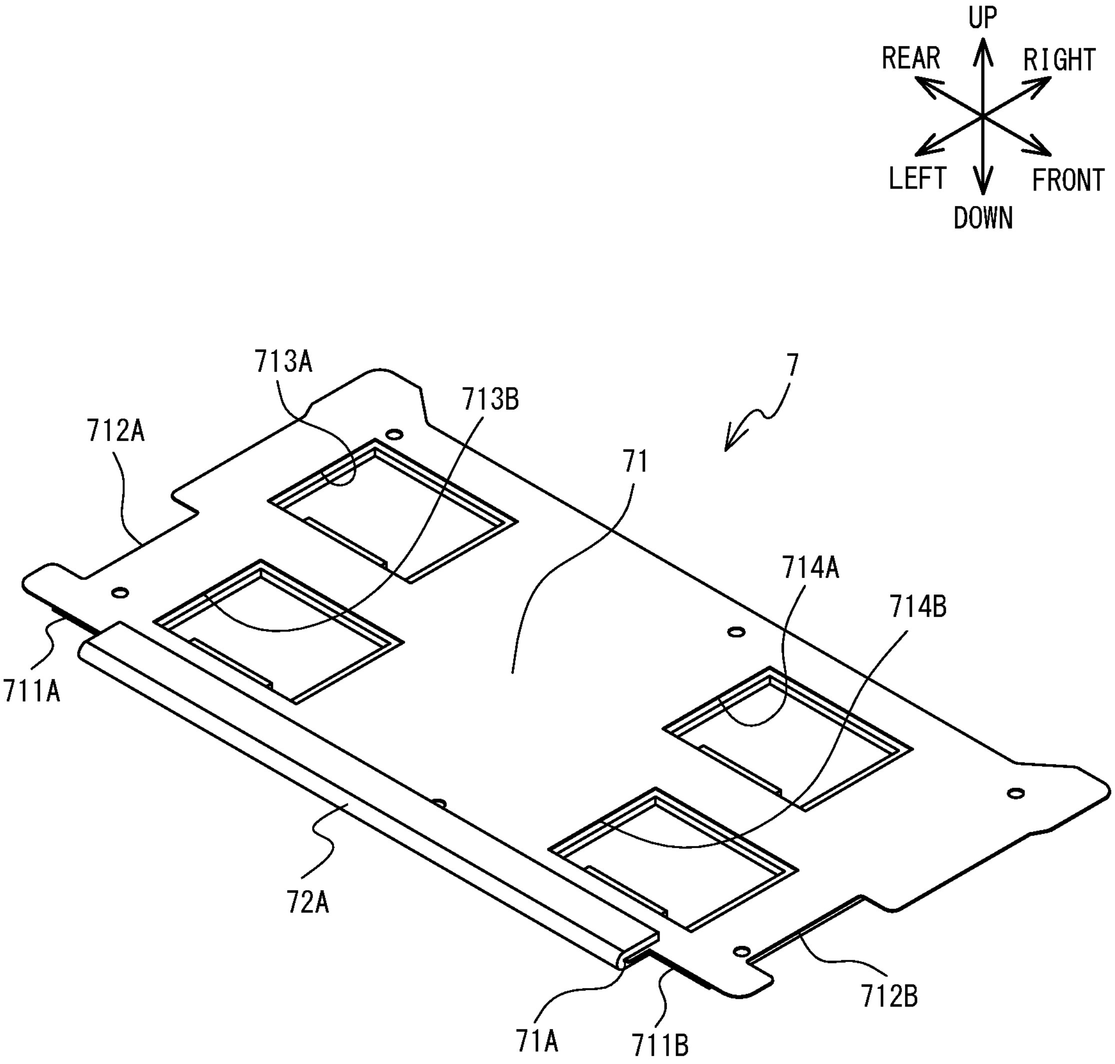
FIG. 6 is a perspective view of the absorption fixture as seen from the front and above.

As illustrated in FIG. 6, the holder 71 includes notched portions 711A, 711B, 712A, and 712B, and holes 713A, 713B, 714A, and 714B. The notched portion 711A is formed by cutting out the rear left end of the holder 71. The notched portion 711B is formed by cutting out the front left end of the holder 71. The notched portion 712A is formed by cutting from the rear end of the holder 71 toward the front. The notched portion 712B is formed by cutting from the front end of the holder 71 toward the rear.

Figure 5:
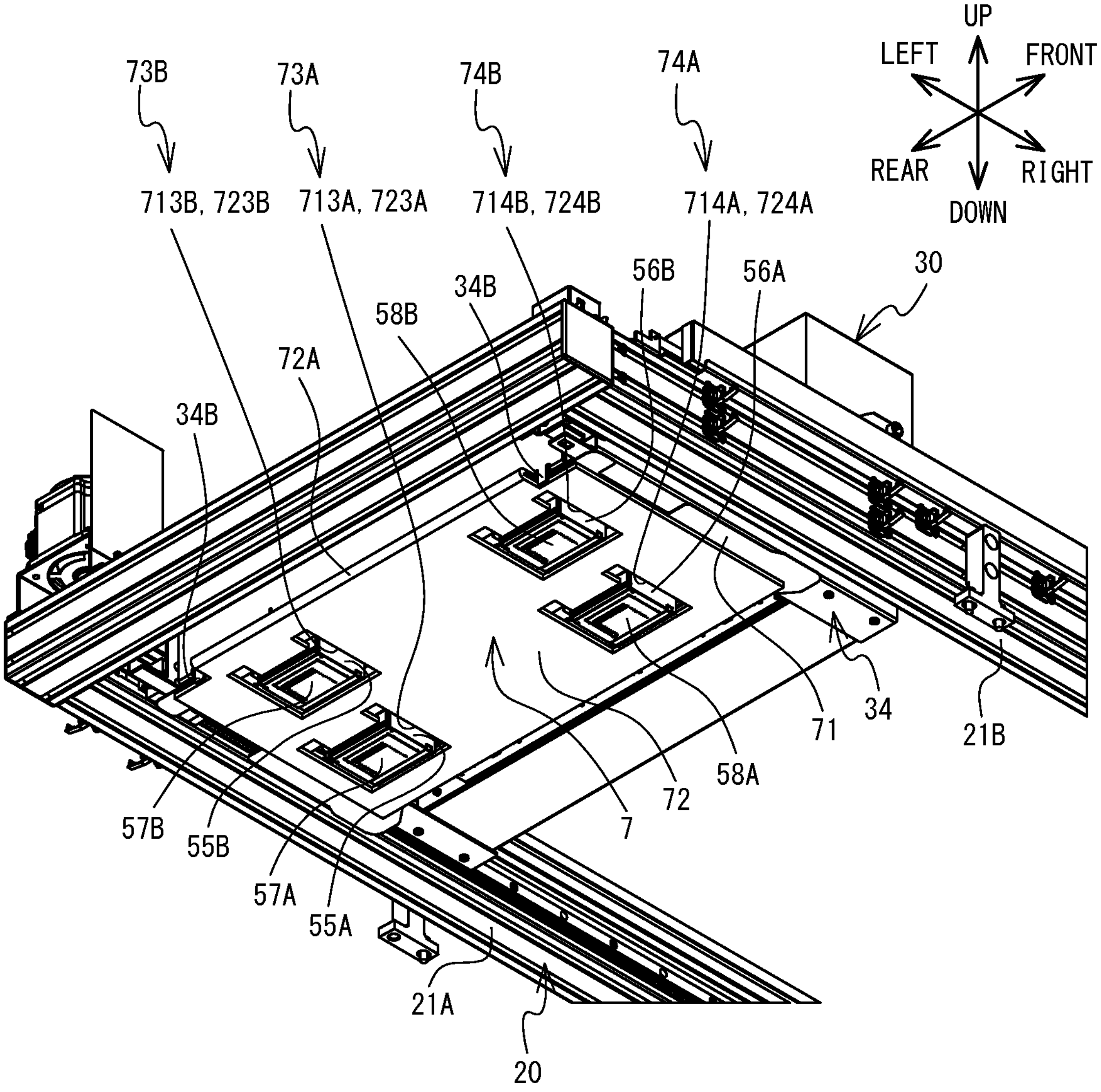
FIG. 5 is a perspective view of the carriage in a state in which the absorption fixture is attached.

The holes 713A, 713B, 714A, and 714B penetrate the holder 71 in the up-down direction. The holes 713A and 714A are disposed alongside each other in the front-rear direction with an interval therebetween. The holes 713B and 714B are disposed alongside each other in the front-rear direction with an interval therebetween. The hole 713B is disposed to the front and left of the hole 713A. The hole 714B is disposed to the left and the front of the hole 714A. As illustrated in FIG. 5, in a state in which the absorption fixture 7 is attached to the support plate 34, the protrusion 55A is inserted through the hole 713A. The protrusion 55B is inserted through the hole 713B. The protrusion 56A is inserted through the hole 714A. The protrusion 56B is inserted through the hole 714B.

Figure 7:
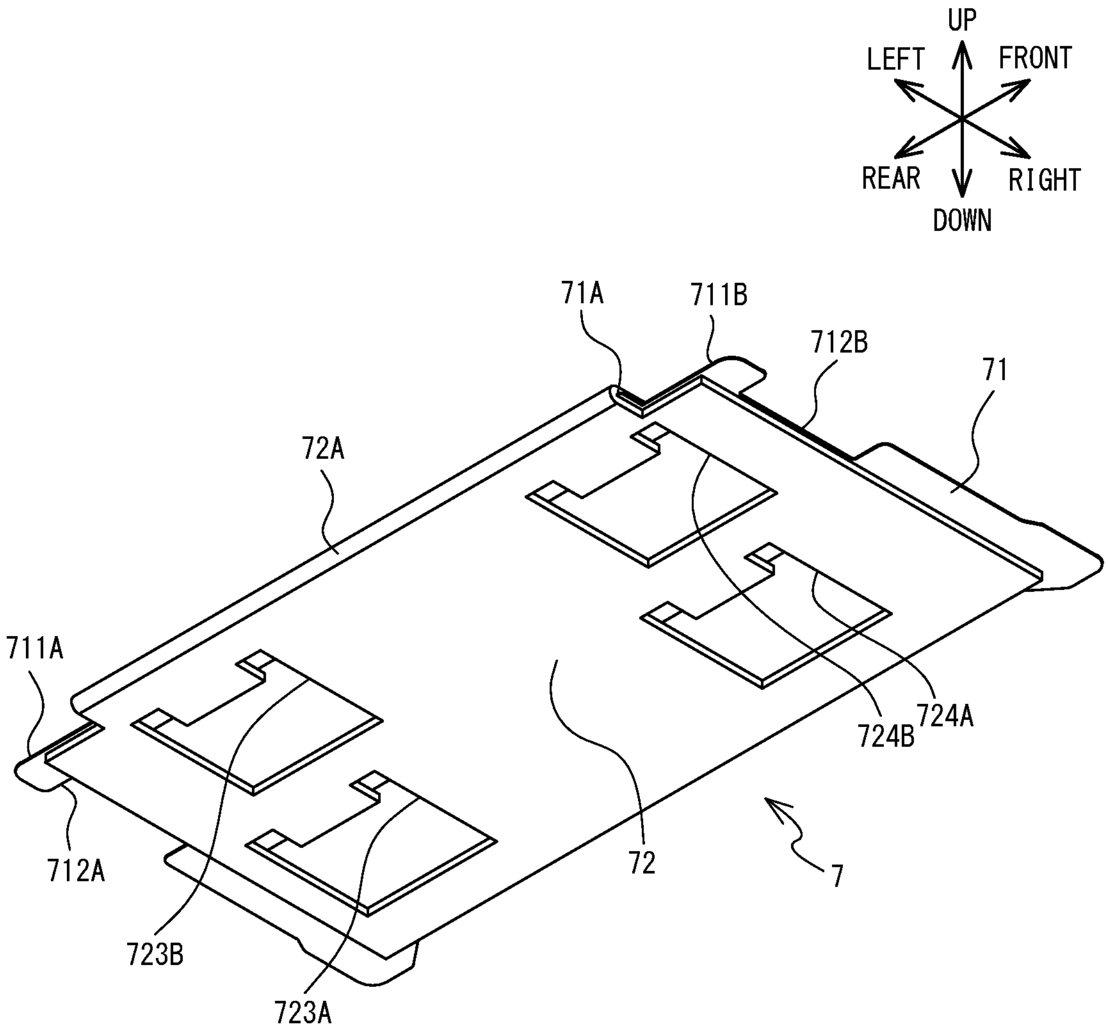
FIG. 7 is a perspective view of the absorption fixture as seen from the front and below.

As illustrated in FIG. 7, the absorption body 72 is disposed on the holder 71. One part of the absorption body 72 is disposed on the lower surface of the holder 71. The absorption body 72 has absorbent properties. The absorption body 72 is a porous material, such as a resin foam or the like. In the present embodiment, the absorption body 72 is formed by a porous material of a melamine resin. The absorption body 72 absorbs a liquid, such as mist formed in some of the ink discharged from the heads 3, or droplets or the like of the cleaning fluid stored in the cleaning fluid vessel 51 that are caused to fly by the wipe mechanism 6, for example. Compared to the absorption body 72 before absorbing the liquid, the absorption body 72 after absorbing the liquid is not deformed by its own weight and the volume thereof does not increase excessively. The absorption body 72 is adhered over the whole lower surface of the holder 71, via an adhesive agent (not illustrated). The adhesive agent is, for example, double-sided tape.

Other part of the absorption body 72 is folded over at a left end 71A of the holder 71. A folded over absorption body 72A is adhered to the upper surface of the holder 71 via an adhesive agent. Since the left end 71A of the holder 71 is covered by the absorption body 72A, the left end 71A does not come into contact with the support plate 34 and the nozzle surface 57A.

The absorption body 72 includes holes 723A, 723B, 724A, and 724B. The holes 723A, 723B, 724A, and 724B each penetrate the absorption body 72 in the up-down direction. The positions of the holes 723A, 723B, 724A, and 724B in a plan view respectively correspond to the positions of the holes 713A, 713B, 714A, and 714B in a plan view. In other words, in the state in which the absorption fixture 7 is attached to the support plate 34, the protrusion 55A is inserted through the hole 723A. The protrusion 55B is inserted through the hole 723B. The protrusion 56A is inserted through the hole 724A. The protrusion 56B is inserted through the hole 724B. Hereinafter, the holes 713A and 723A are referred to together as holes 73A. The holes 713B and 723B are referred to together as holes 73B. The holes 714A and 724A are referred to together as holes 74A. The holes 714B and 724B are referred to together as holes 74B. In the state in which the absorption fixture 7 is attached to the support plate 34, the absorption body 72 is disposed to the front, the rear, the right, and the left of the nozzle surfaces 57A, 57B, 58A, and 58B.

Assistance Members 23A and 23B

As illustrated in FIG. 8 to FIG. 12, when attaching the absorption fixture 7 to the support plate 34, assistance members 23A and 23B guide the absorption fixture 7. The assistance members 23A and 23B are respectively provided on the frame 22A. The assistance members 23A and 23B are disposed alongside each other with an interval therebetween in the front-rear direction. The assistance member 23A is disposed to the rear of the assistance member 23B. The structure of the assistance member 23B and the structure of the assistance member 23A are front-rear symmetrical to each other. Hereinafter, only the structure of the assistance member 23A will be described, and a description of the structure of the assistance member 23B will be omitted.

Figure 8:
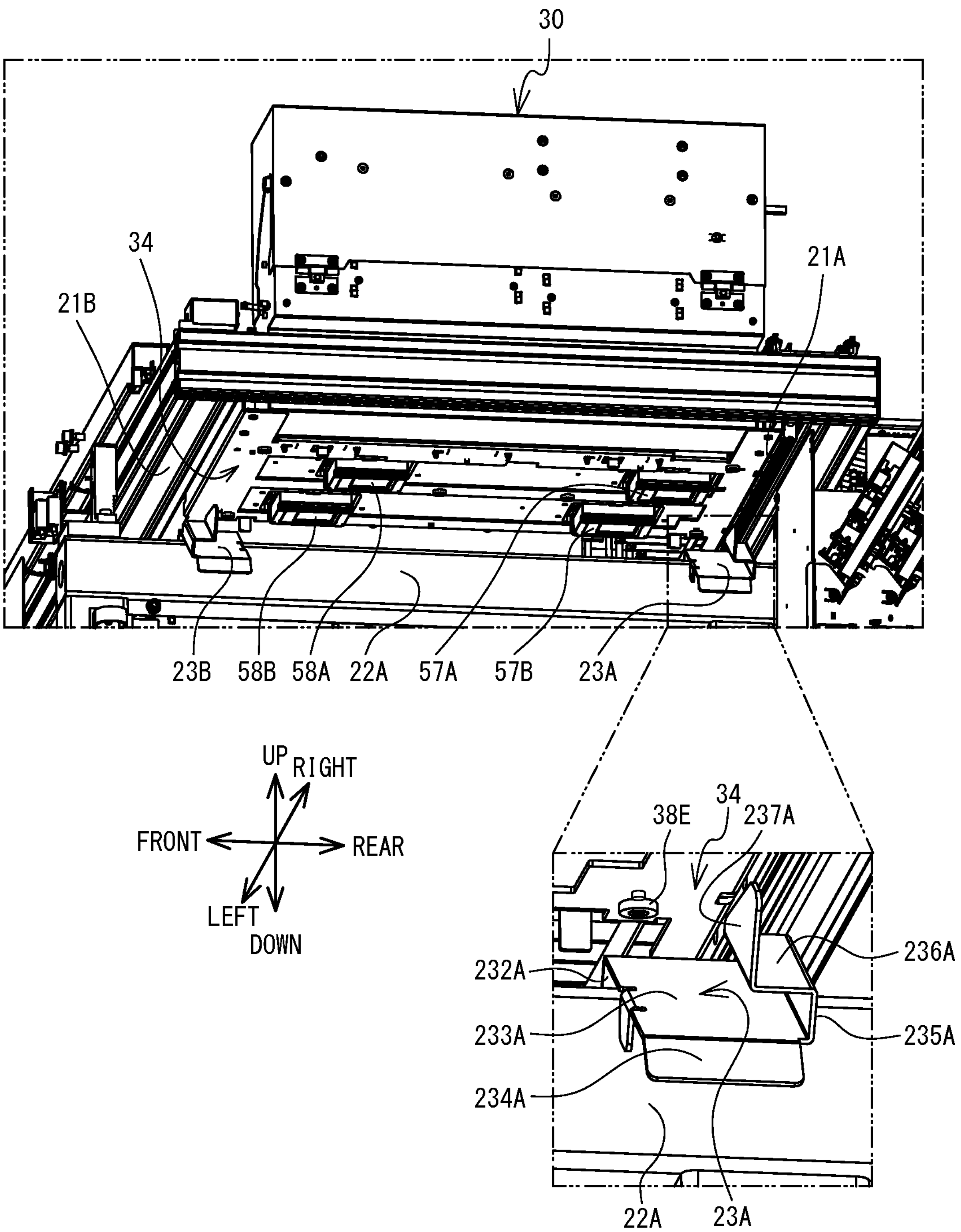
FIG. 8 is a perspective view of a vicinity of the carriage positioned at a second reference position.
Figure 9:
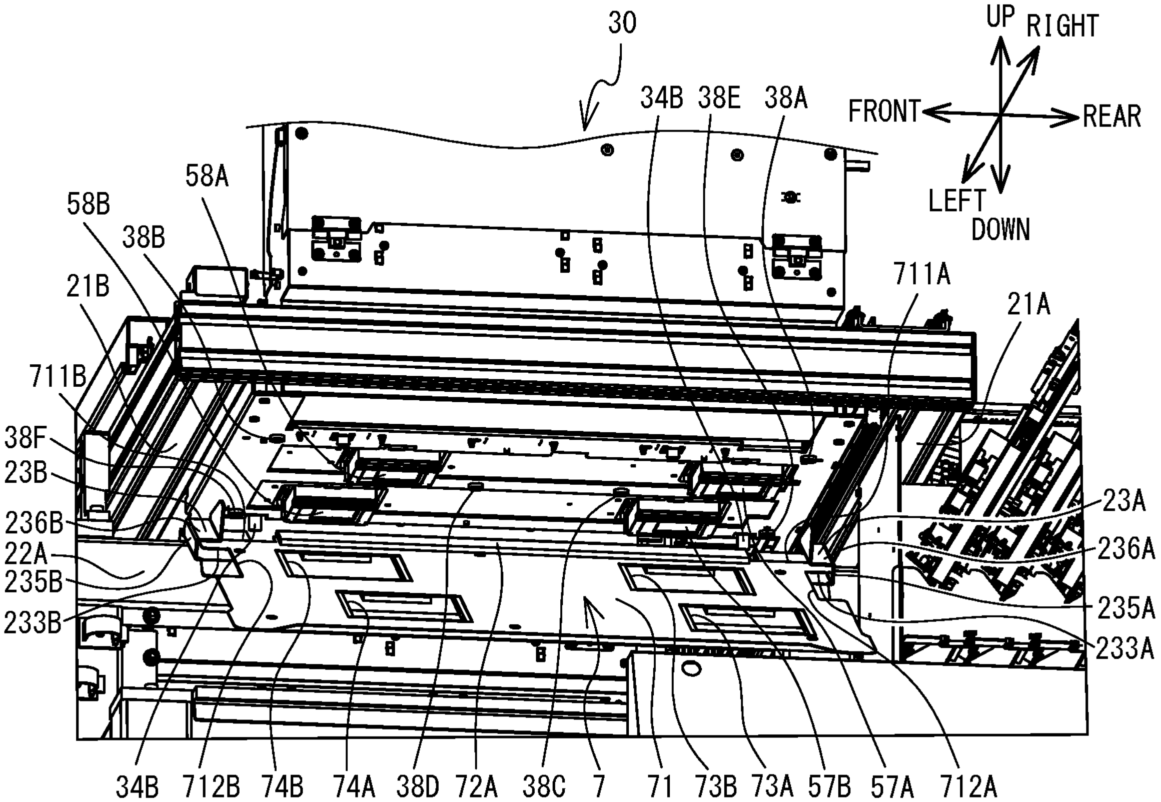
FIG. 9 is a perspective view of a state in which the absorption fixture is positioned at a position different from an attachment position.
Figure 10:
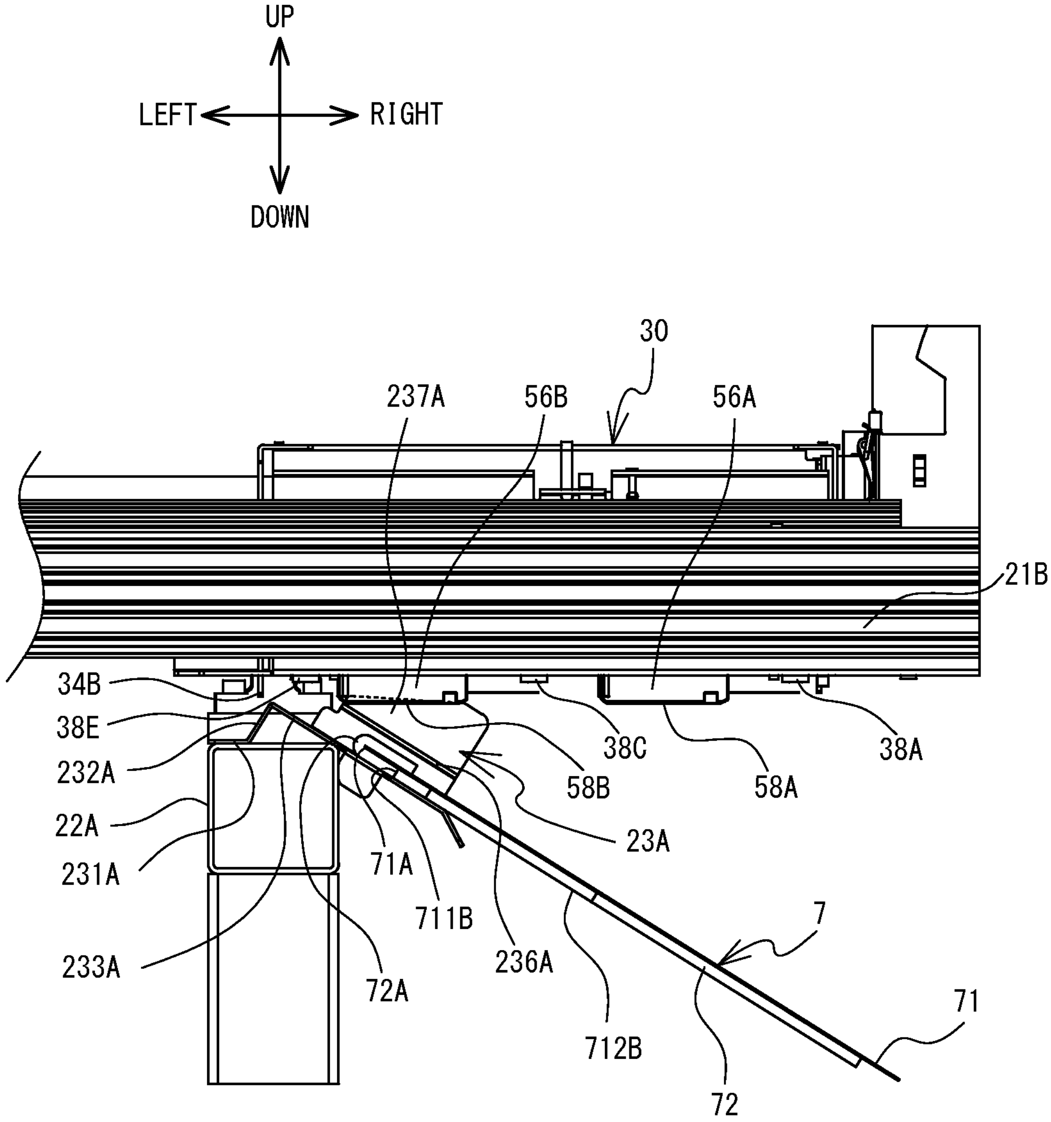
FIG. 10 is a front view of the state in which the absorption fixture is positioned at the position different from the attachment position.

As illustrated in FIG. 8 to FIG. 10, the assistance member 23A includes plate portions 231A (refer to FIG. 10), 232A, 233A, 234A, 235A, 236A, and 237A. As illustrated in FIG. 10, the plate portion 231A is fixed to the upper surface of the frame 22A. The plate portion 232A extends upward and to the right from the right end of the plate portion 231A. As illustrated in FIG. 8, the plate portion 233A extends downward and to the right from the right end of the plate portion 232A. The right end of the plate portion 233A is positioned further to the right than the right end of the frame 22A, in the left-right direction. The plate portion 234A extends downward and to the right from the right end of the plate portion 233A. The right end of the plate portion 234A is positioned further downward than the right end of the plate portion 233A, in the up-down direction.

The plate portion 235A extends upward from the rear end of the plate portion 233A. The plate portion 236A extends to the front from the upper end of the plate portion 235A. In interval between the plate portion 233A and the plate portion 236A in the up-down direction is constant. The front end of the plate portion 236A is positioned further to the rear than the front end of the plate portion 233A, in the front-rear direction. The length of the plate portion 236A in the front-rear direction is shorter than the length, in the front-rear direction, of the notched portions 712A and 712B (refer to FIG. 6) of the holder 71. The plate portion 237A extends upward from the front end of the plate portion 236A.

As illustrated in FIG. 10, the upper end of the plate portion 237A is positioned further upward than the upper end of the nozzle surface 58B, in the up-down direction. The right end of the plate portion 237A is positioned further to the right than the right end of the nozzle surface 58B, in the left-right direction.

Plate portions 233B, 235B, and 236B of the assistance member 23B respectively correspond to the plate portions 233A, 235A, and 236A of the assistance member 23A.

Attachment of Absorption Fixture 7

In a state in which the carriage 30 is positioned at a second reference position, the absorption fixture 7 is attached to the support plate 34 using the assistance members 23A and 23B. The second reference position is a position further to the right than the printing region 20R on the movement path of the carriage 30. In the state in which the carriage 30 is positioned at the second reference position, the position of the absorption fixture 7 attached to the support plate 34 is referred to as an attachment position.

As illustrated in FIG. 9 and FIG. 10, in a state in which the absorption body 72 is positioned below the holder 71, a user moves the absorption fixture 7 to the left toward the assistance members 23A and 23B. The user inserts the left end portion of the absorption fixture 7 with respect to the assistance members 23A and 23B, from the right. The rear left end portion of the absorption fixture 7 is inserted into a space surrounded by the plate portions 233A, 235A, and 236A. The front left end portion of the absorption fixture 7 is inserted into a space surrounded by the plate portions 233B, 235B, and 236B.

When the absorption fixture 7 is positioned at a position different from the attachment position, the notched portions 711A and 711B are separated, to the right, from the positioners 34B. In this state, when the user moves the absorption fixture 7 upward toward the support plate 34, the absorption fixture 7 comes into contact with the plate portion 236A and 236B. When the absorption fixture 7 is positioned at a position different from the attachment position, the user cannot attach the absorption fixture 7 to the support plate 34.

Figure 11:
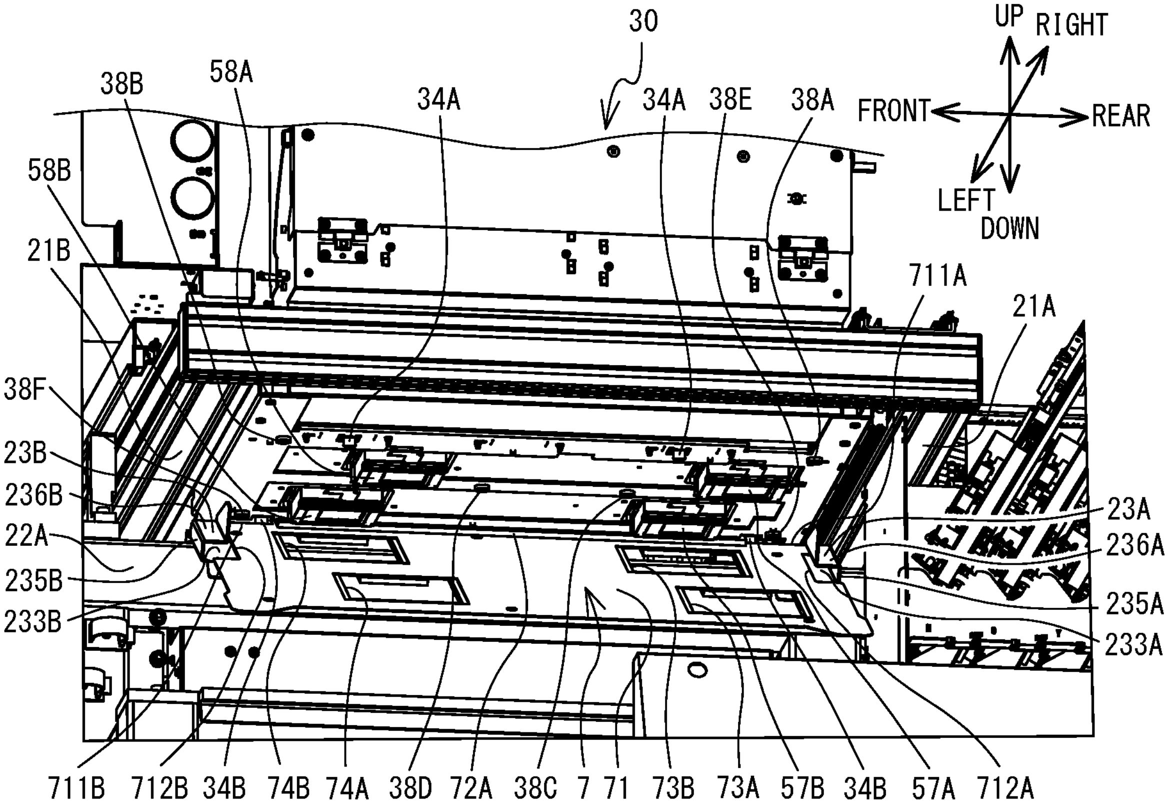
FIG. 11 is a perspective view of a state in which the absorption fixture is positioned at the attachment position.
Figure 12:
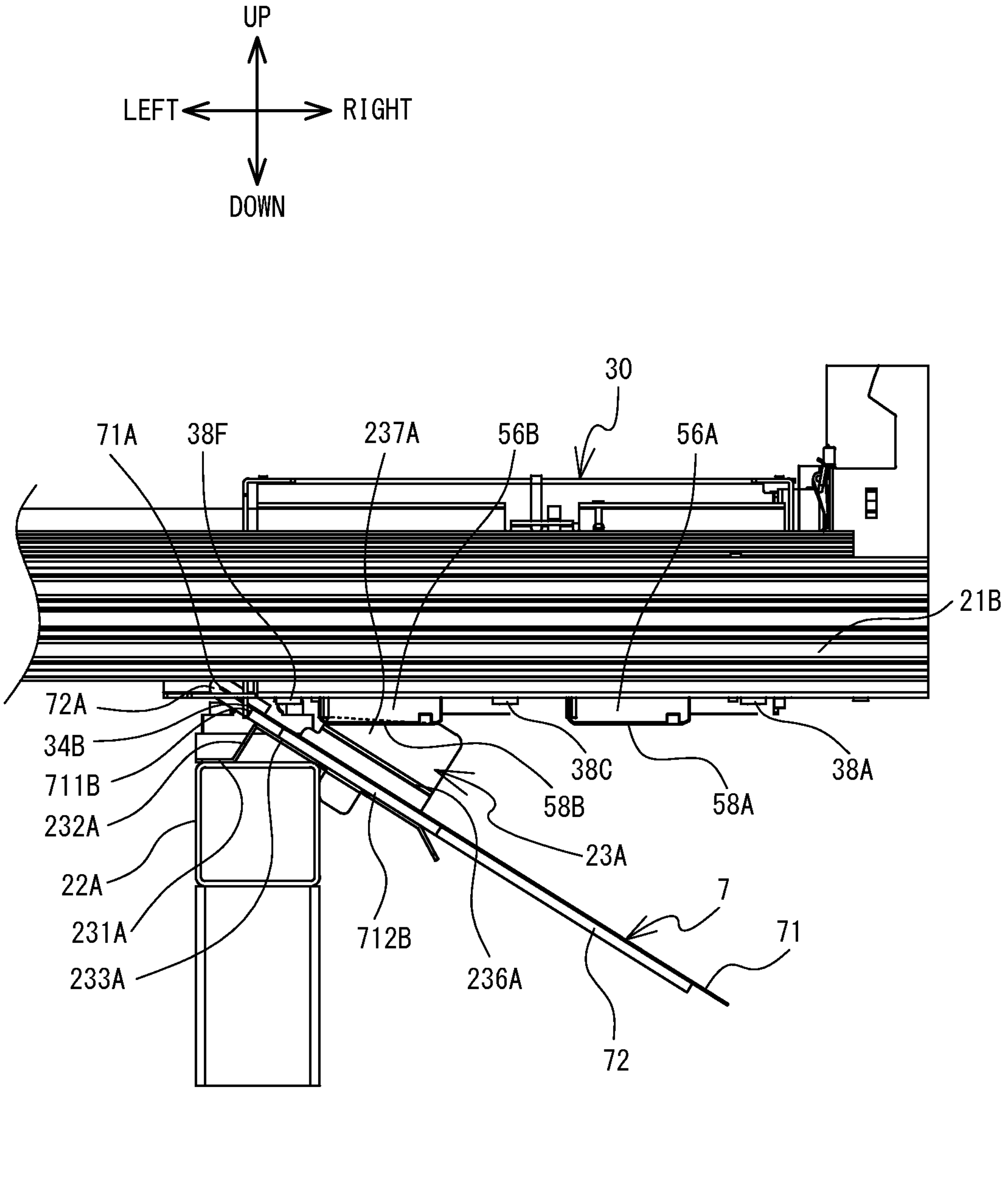
FIG. 12 is a front view of the state in which the absorption fixture is positioned at the attachment position.

As illustrated in FIG. 11 and FIG. 12, when the absorption fixture 7 is positioned at the attachment position, the notched portions 711A and 711B come into contact with the positioners 34B. In this way, the absorption fixture 7 is positioned with respect to the support plate 34. In this case, the notched portions 712A and 712B are disposed below the plate portions 236A and 236B. In this state, when the user moves the absorption fixture 7 upward toward the support plate 34, the absorption fixture 7 does not come into contact with the plate portions 236A and 236B. When the absorption fixture 7 moves further upward toward the support plate 34, the holder 71 is attracted to the magnets 38A to 38F. In this way, the absorption fixture 7 is attached to the support plate 34.

Covering of Heads 3 by Caps 4

Figure 13:
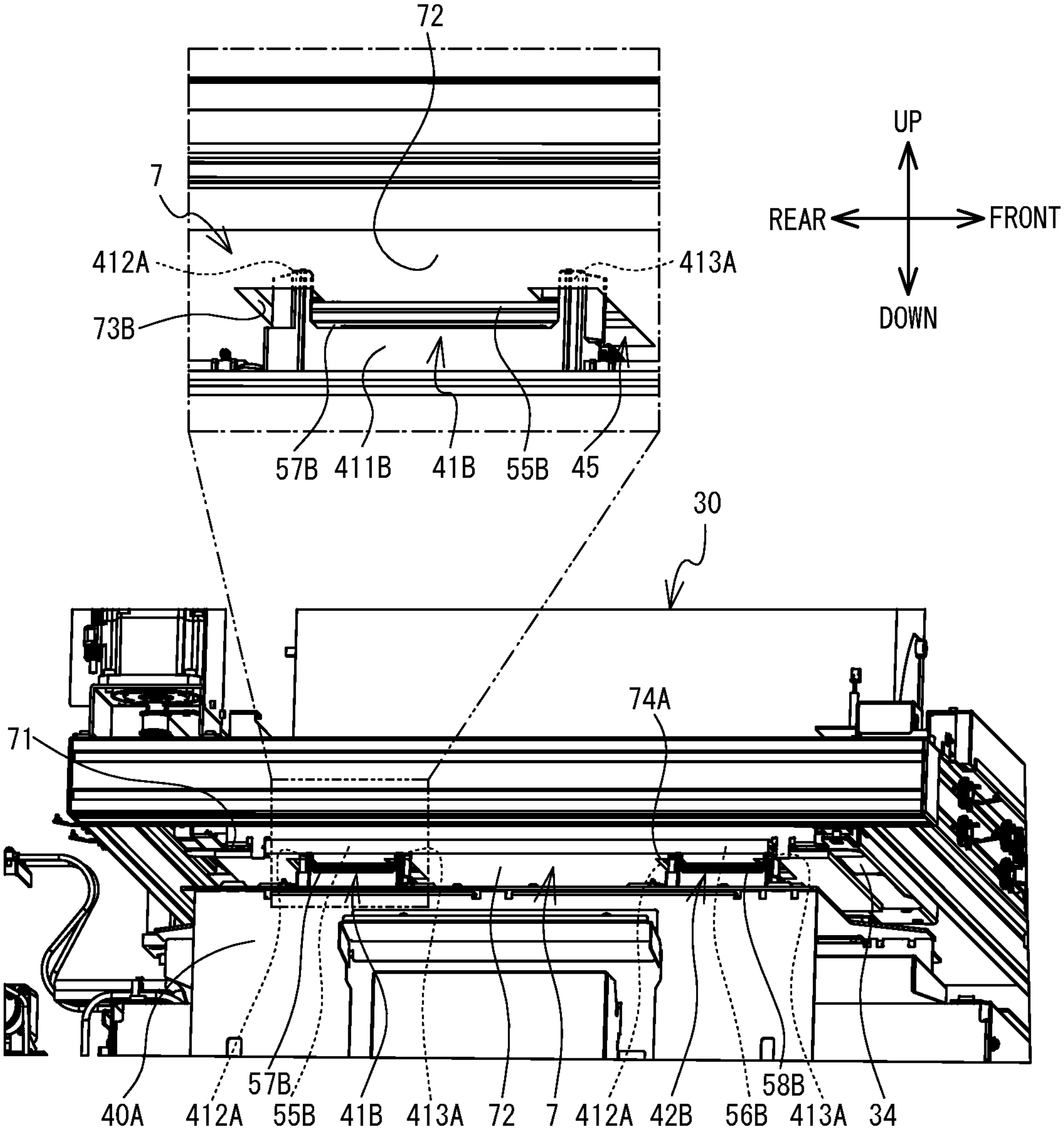
FIG. 13 is a perspective view of a state in which a second cap is covering a nozzle surface.

During a period in which the printing on the print medium is not performed, the printer 1 disposes the carriage 30 at the first reference position. As illustrated in FIG. 13, the printer 1 moves the support portion 40A upward. When the support portion 40A moves upward, the right surfaces of the protrusions 412A and 413A of the second caps 41B and 42B respectively come into contact with the left surfaces of the protrusions 55B and 56B. When the support portion 40A moves further upward, the protrusions 412A and 413A are inserted into gaps 45 between the inner surfaces of each of the holes 73B and 74B and the side surfaces of the protrusions 55B and 56B. The covering portions 414A of each of the second caps 41B and 42B are guided by the protrusions 412A and 413A, and respectively face the nozzle surfaces 57B and 58B in the up-down direction.

Although not illustrated, when the support portion 40A moves upward the right surfaces of the protrusions 412A and 413A of the first caps 41A and 42A respectively come into contact with the left surfaces of the protrusions 55A and 56A. When the support portion 40A moves further upward, the protrusions 412A and 413A are inserted into gaps between the inner surfaces of each of the holes 73A and 74A and the side surfaces of the protrusions 55A and 56A. The covering portions 414A of each of the first caps 41A and 42A are guided by the protrusions 412A and 413A, and respectively face the nozzle surfaces 57A and 58A in the up-down direction.

The first cap 41A covers the nozzle surface 57A (refer to FIG. 5). The first cap 42A covers the nozzle surface 58A (refer to FIG. 5). The second cap 41B covers the nozzle surface 57B. The second cap 42B covers the nozzle surface 58B. As a result of the caps 4 covering each of the nozzle surfaces 57A, 57B, 58A, and 58B, the ink is suppressed from drying out during the period in which the printing on the print medium is not performed. In the state in which the first caps 41A and 42A and the second caps 41B and 42B are covering each of the nozzle surfaces 57A, 57B, 58A, and 58B, the liquid that has attached to the holder 71 or the inner surface of the hole 74A come into contact with the protrusions 412A and 413A. The liquid that has come into contact with the protrusions 412A and 413A flows, under its own weight, along the protrusions 412A and 413A downward from the holder 71 and the absorption body 72.

Wiping Operation by Wipe Mechanism 6

A wiping operation of the nozzle surfaces 57A, 57B, 58A, and 58B by the wipe mechanism 6 will be described with reference to FIG. 14 to FIG. 19. In FIG. 14 to FIG. 19, only the wiping operation of the nozzle surfaces 58A and 58B is illustrated, but the wiping of the nozzle surfaces 57A and 57B is also performed in a similar manner to that of the nozzle surfaces 58A and 58B. Hereinafter, the wiping operation of the nozzle surface 58A by the front-side first wiper 60A, of the two first wipers 60A, and the wiping operation of the nozzle surface 58B by the front-side second wiper 60B, of the two second wipers 60B, will be described.

Figure 14:
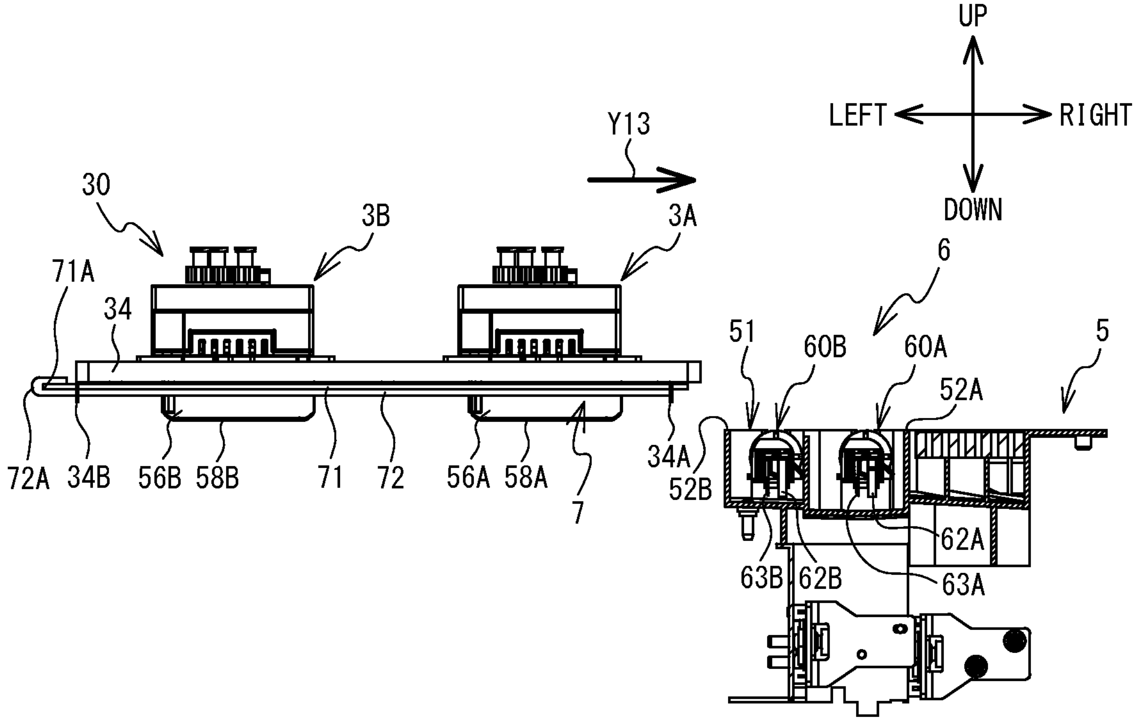
FIG. 14 is a diagram illustrating a positional relationship of the carriage in a first reference position and a wiper mechanism.

As illustrated in FIG. 14, the printer 1 moves the first wiper 60A and the second wiper 60B to the non-contact position. The printer 1 moves the carriage 30 that is at the first reference position to the right toward the wipe mechanism 6 (an arrow Y13).

Figure 15:
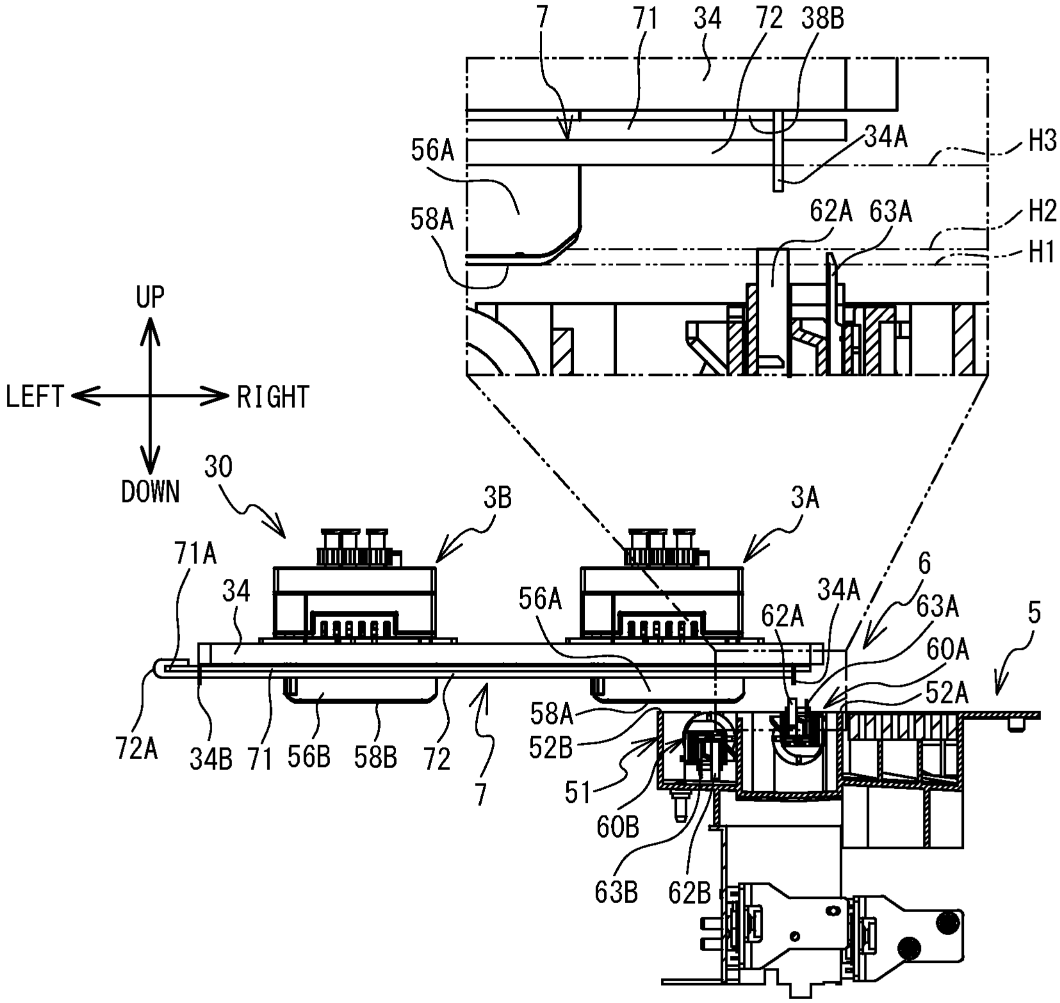
FIG. 15 is a diagram illustrating a state before a first wiper wipes a nozzle surface.

As illustrated in FIG. 15, the printer 1 moves the first wiper 60A from the non-contact position to the contact position. Note that the second wiper 60B is maintained at the non-contact position. When the first wiper 60A moves upward from the non-contact position toward the contact position, the first wiper 60A passes through the liquid surface of the cleaning fluid. In a state in which the first wiper 60A is positioned at the contact position and is not in contact with the nozzle surface 58A, a position H1, in the up-down direction, of the nozzle surface 58A, a position H2, in the up-down direction, of the leading end of the first wiper 60A, and a position H3, in the up-down direction, of the lower end of the absorption body 72 are aligned in order from below. Even if the absorption body 72 is in a state of having absorbed liquid, the positional relationship of the positions H1, H2, and H3 does not change.

Figure 16:
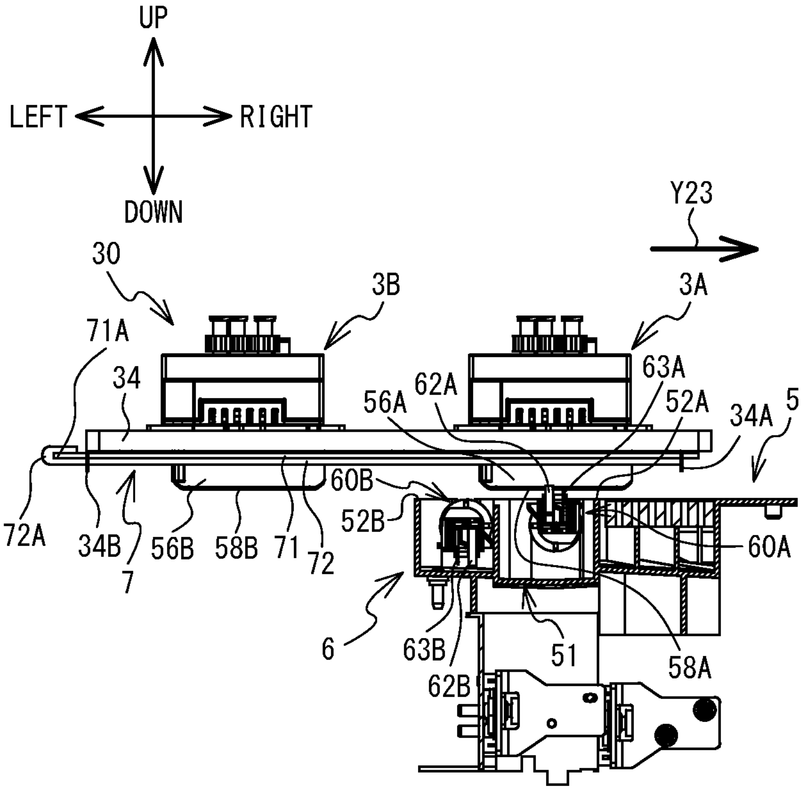
FIG. 16 is a diagram illustrating a state in which the first wiper wipes the nozzle surface.

As illustrated in FIG. 16, the printer 1 moves the carriage 30 to the right (an arrow Y23). In the course of the movement of the carriage 30, the first heads 3A passes over the first wiper 60A that is at the contact position. The first wiper 60A comes into contact with the nozzle surface 58A in the order of the first foam wiper 62A and the first rubber wiper 63A. The first wiper 60A wipes the nozzle surface 58A from the right to the left.

Figure 17:
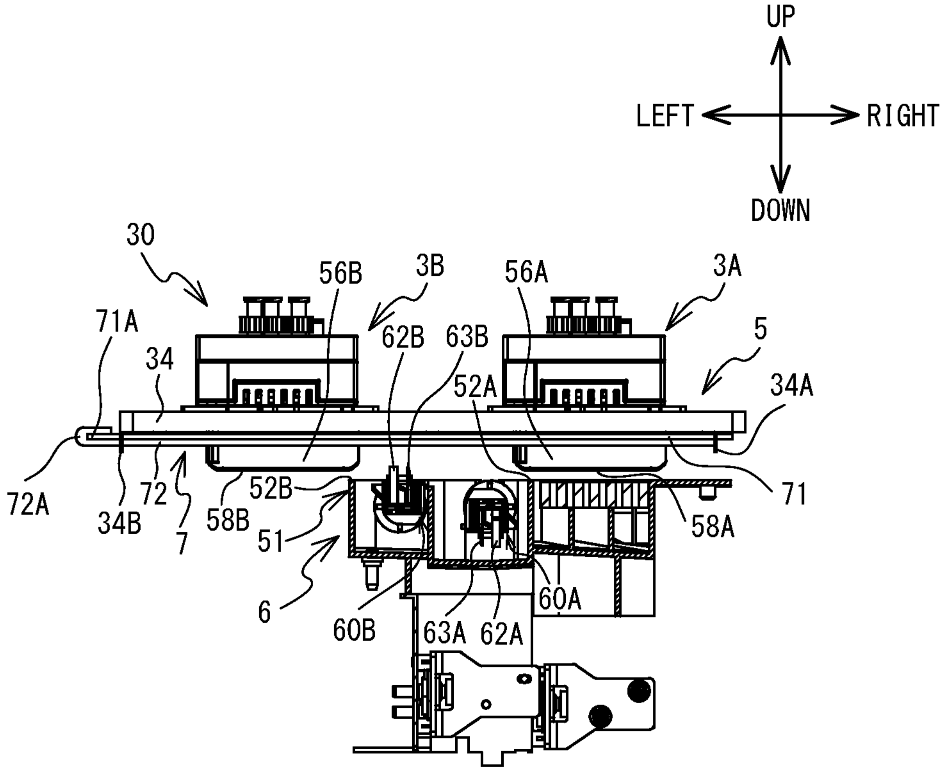
FIG. 17 is a diagram illustrating a state before a second wiper wipes the nozzle surface.

As illustrated in FIG. 17, after wiping the nozzle surface 58A, the printer 1 moves the first wiper 60A from the contact position to the non-contact position. When the first wiper 60A moves downward from the contact position toward the non-contact position, the first wiper 60A passes through the liquid surface of the cleaning fluid. The printer 1 moves the second wiper 60B from the non-contact position to the contact position. When the second wiper 60B moves upward from the non-contact position to the contact position, the second wiper 60B passes through the liquid surface of the cleaning fluid.

Figure 18:
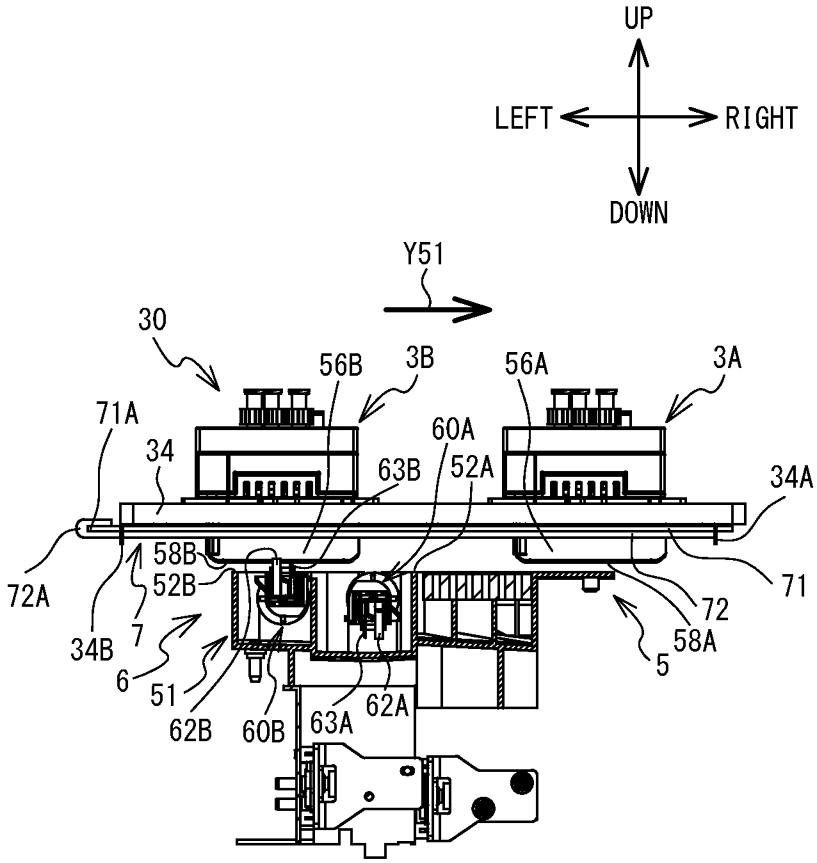
FIG. 18 is a diagram illustrating a state in which the second wiper wipes the nozzle surface.

As illustrated in FIG. 18, the printer 1 moves the carriage 30 to the right (an arrow Y51). In the course of the movement of the carriage 30, the second heads 3B passes over the second wiper 60B that is at the contact position. The second wiper 60B comes into contact with the nozzle surface 58B in the order of the second foam wiper 62B and the second rubber wiper 63B. The second wiper 60B wipes the nozzle surface 58B from the right to the left.

Figure 19:
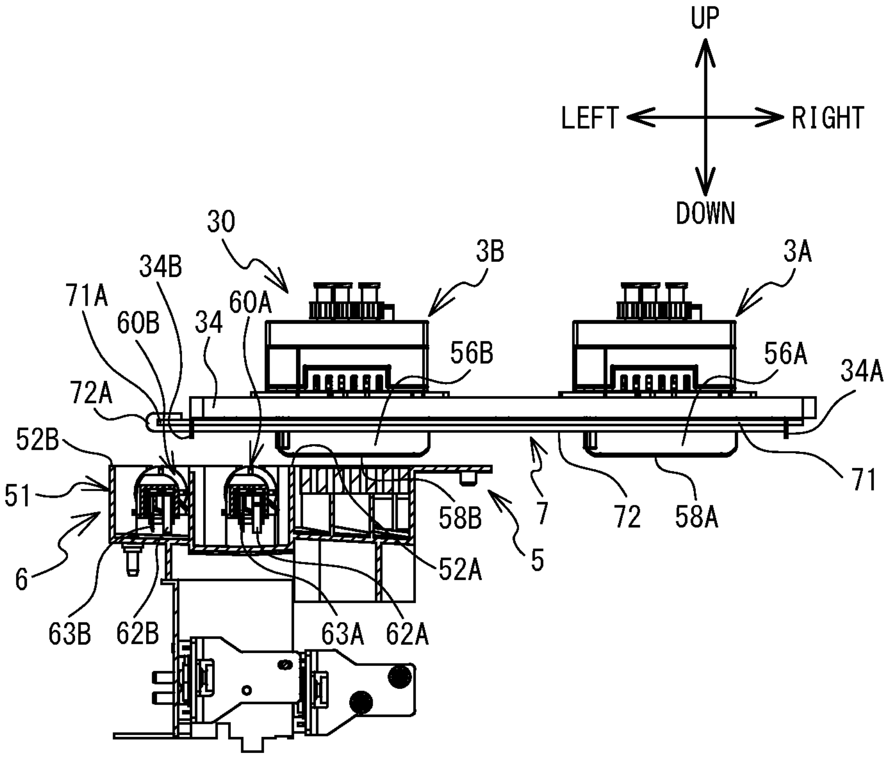
FIG. 19 is a diagram illustrating a positional relationship of the carriage and the wiper mechanism after a wiping operation is complete.

As illustrated in FIG. 19, after wiping the nozzle surface 58B, the printer 1 moves the second wiper 60B from the contact position to the non-contact position. When the second wiper 60B moves downward from the contact position toward the non-contact position, the second wiper 60B passes through the liquid surface of the cleaning fluid. The printer 1 stops the movement of the carriage 30.

Actions and Effects of Present Embodiment

The absorption fixture 7 is provided downward of the support plate 34. The absorption fixture 7 is exposed to the platen 12. The absorption fixture 7 is provided with the absorption body 72. The absorption body 72 has absorbent properties. The printer 1 can reduce the possibility of liquid falling onto the print medium placed on the platen 12, by the absorption body 72 absorbing the liquid (ink that has turned to mist, for example). Thus, the printer 1 can reduce the possibility of the print medium becoming contaminated.

The position in the up-down direction of the nozzle surfaces 57A, 57B, 58A, and 58B is a position lower than the position in the up-down direction of the support plate 34. The position H3, in the up-down direction, of the lower end of the absorption body 72 is positioned higher than the position H1, in the up-down direction, of the nozzle surfaces 57A, 57B, 58A, and 58B. Thus, the printer 1 can reduce the possibility of the ink discharged from the nozzles of the nozzle surfaces 57A, 57B, 58A, and 58B being absorbed by the absorption body 72 before attaching to the print medium.

There is no excessive expansion in the shape and the volume of the absorption body 72 as a result of its own weight before and after absorbing the liquid. Thus, even when the absorption body 72 has absorbed the liquid, the positional relationship of the position H3 and the position H1 does not change. Thus, even when the absorption body 72 is in the state of having absorbed the liquid, the printer 1 can reduce the possibility of the ink discharged from the nozzles of the nozzle surfaces 57A, 57B, 58A, and 58B being absorbed by the absorption body 72 before attaching to the print medium.

In the up-down direction, the position H3 is positioned higher than the position H2, in the up-down direction, of the leading ends of the first wipers 60A and the second wipers 60B. Thus, the printer 1 can reduce the possibility of the first wipers 60A or the second wipers 60B transferring the liquid absorbed by the absorption body 72 to the nozzle surfaces 57A, 57B, 58A, and 58B.

The first wipers 60A wipe the nozzle surfaces 57A and 58A from the right to the left. The second wipers 60B wipe the nozzle surfaces 57B and 58B from the right to the left. The absorption body 72 is disposed to the right and the left of the nozzle surfaces 57A, 57B, 58A, and 58B. Thus, the printer 1 can absorb the liquid dispersed from the wipe mechanism 6, using the absorption body 72.

The platen 12 moves in the front-rear direction (the sub-scanning direction) with respect to the carriage 30, by the driving of the platen motor. The absorption body 72 is disposed to the front and the rear of the nozzle surfaces 57A, 57B, 58A, and 58B. Thus, the printer 1 can absorb the liquid, using the absorption body 72, when the platen 12 moves relatively in the sub-scanning direction.

The absorption body 72 is provided so as to be replaceable on the support plate 34. Thus, by replacing the absorption body 72, the printer 1 can reduce the possibility of liquid absorbed by the absorption body 72 falling onto the print medium.

The holder 71 holds the absorption body 72. The holder 71 is formed of a magnetic metal. The magnets 38A to 38F are provided on the lower surface of the support plate 34. The absorption body 72 is attached to the support plate 34 by the holder 71 being attracted by the magnets 38A to 38F. The absorption body 72 is removed from the support plate 34 by the holder 71 being removed from the magnets 38A to 38F. Thus, the user can easily replace the absorption body 72.

The support plate 34 is provided with the positioners 34A and 34B. When attaching the absorption body 72 to the support plate 34, the notched portions 711A and 711B and the positioners 34B come into contact with each other, and the absorption body 72 is thus positioned with respect to the support plate 34. When the absorption body 72 is not positioned with respect to the support plate 34, since the positional relationship between the absorption body 72 and the support plate 34 changes, there is a case in which an excessive force is applied to the magnets 38A to 38F that attract the holder 71. In this case, the attachment of the absorption body 72 to the support plate 34 becomes unstable. In the printer 1, since the absorption body 72 is positioned by the positioners 34A and 34B, the absorption body 72 is attached to the support plate 34 in a stable manner. Further, in the state in which the absorption body 72 is attached to the support plate 34, each of the positioners 34A and 34B restricts the movement in the left-right direction (the main scanning direction) of the absorption fixture 7. Thus, the absorption body 72 is attached to the support plate 34 in the stable manner, without the holder 71 becoming displaced from the magnets 38A to 38F.

When attaching the absorption fixture 7 to the support plate 34, the user inserts the rear left end portion of the absorption fixture 7 into the space surrounded by the plate portions 233A, 235A, and 236A. The user inserts the front left end portion of the absorption fixture 7 into the space surrounded by the plate portions 233B, 235B, and 236B. When the absorption fixture 7 is positioned at a position different from the attachment position, the plate portions 236A and 236B restrict the absorption fixture 7 from moving upward toward the support plate 34. By the user moving the absorption fixture 7 to the left and upward along the plate portions 233A and 233B, the absorption fixture 7 is positioned at the attachment position. When the absorption fixture 7 is positioned at the attachment position, the notched portions 712A and 712B are disposed below the plate portions 236A and 236B. In this state, the user can move the absorption fixture 7 upward toward the support plate 34 without restriction by the plate portions 236A and 236B. Thus, the printer 1 can reduce the possibility of the absorption body 72 being attached to the support plate 34 at position different from the attachment position.

The caps 4 are provided further to the left than the printing region 20R, of the region inside the printer 1. The protrusions 412A and 413A of the first cap 41A receive the liquid attached to the support plate 34 or to the inner surface of the hole 74A of the absorption fixture 7, and cause the liquid to escape downward toward the support portion 40A. The printer 1 can reduce the possibility of the liquid contaminating the print medium, by causing the liquid attached to at least one of the absorption body 72 or the holder 71 to escape using the protrusions 412A and 413A.

The protrusions 412A and 413A are respectively disposed in the gaps 45 between the inner surfaces of the holes 73B and 74B and the side surfaces of the protrusions 55B and 56B. Thus, the printer 1 can cause the liquid attached to the inner surfaces of the holes 73B and 74B of the absorption fixture 7 to escape via the protrusions 412A and 413A.

The holder 71 is the flat plate that extends in the front-rear direction and the left-right direction. The left end 71A of the holder 71 is covered by the absorption body 72A. Thus, the absorption body 72 can reduce the possibility that the left end 71A of the holder 71 comes into contact with the support plate 34, the nozzle surface 57A, and the like.

The left end 71A of the holder 71 is covered by folding back the part of the absorption body 72. In this way, the configuration for covering the left end 71A of the holder 71 can be formed using the absorption body 72. Thus, it is not necessary to provide a separate member for covering the left end 71A of the holder 71.

Modified Examples

Various modification can be made to the present disclosure from the above-described embodiment. Various modified examples to be described below can be combined insofar as no contradictions occur. The respective movement mechanisms of the heads 3 and the platen 12 are not limited to those of the above-described embodiment. For example, the heads 3 and the platen 12 may each be moved by a movement mechanism such as a roller, a ball screw, or the like. The heads 3 may be line heads. It is sufficient that the heads 3 be able to move in the left-right direction relative to the caps 4, the first wipers 60A, the second wipers 60B, and the platen 12. In other words, a configuration may be adopted in which the carriage 30 is fixed to the frame body 20, and the caps 4, the first wipers 60A, the second wipers 60B, and the platen 12 are able to move in the left-right direction. When the platen 12 is able to move to in the left-right direction, a configuration may be adopted in which some of the caps 4, the first wipers 60A, the second wipers 60B, and the platen 12, such as the caps 4, for example, are able to move in the left-right direction. A configuration may be adopted in which the platen 12 is fixed to the frame body 20, and the heads 3 are able to move in the front-rear direction.

The cap mechanism 40 and the cleaning assembly 5 may be provided further to the right than the printing region 20R, of the region inside the printer 1. A positional relationship in the left-right direction of the cap mechanism 40 and the cleaning assembly 5 may be changed as appropriate.

The platen 12 and the nozzle surfaces 57A, 57B, 58A, and 58B may face each other in the left-right direction, or may face each other in the front-rear direction. For example, when the platen 12 and the nozzle surfaces 57A, 57B, 58A, and 58B face each other in the left-right direction or the front-rear direction, the heads 3 may move in the up-down direction relative to the platen 12.

The printer 1 may include a third head in addition to the first head 31A and the second head 31B. The first head 31A and the second head 31B may have mutually different structures. The first head 31A and the second head 31B may discharge a common ink. In the above-described embodiment, the structure of the first head 32A and the second head 32B, the type of ink discharged, and the mutual positional relationship are the same as for the first head 31A and the second head 31B of the head 31, but the configuration is not limited to this example. For example, the positions of the nozzle surfaces 57A, 57B, 58A, and 58B in the up-down direction may be mutually different.

The protrusion 412A may protrude upward from the upper end of the rear right end portion of the frame body 411A. In addition to the protrusions 412A and 413A, the first cap 41A may be provided with a member that causes the liquid attached to the support plate 34 or the inner surface of the hole 74A of the absorption fixture 7 to escape. The direction in which the protrusions 412A and 413A cause the liquid to escape is not limited to the downward direction. The protrusions 412A and 413A of the first cap 41A may receive the liquid attached to the support plate 34 and to the inner surface of the hole 74A of the absorption fixture 7, and cause the liquid to escape downward toward the support portion 40A.

The absorption body 72 is not limited to the porous material such as the resin foam or the like, and may be an absorbent non-woven fabric. There is a case in which, after the non-woven fabric has absorbed the liquid, the non-woven fabric hangs downward under its own weight, and it is thus preferable to use a material with which there is no excessive expansion in the shape and the volume as a result of its own weight before and after absorbing the liquid, as in the above-described embodiment.

The absorption body 72 may be fixed to the support plate 34. In this case, the printer 1 need not necessarily be provided with the assistance members 23A and 23B.

The absorption body 72 may be directly attached to the support plate 34. The holder 71 may be configured by inserting a magnetic metal into a thermoset resin. In the case of this configuration, the absorption fixture 7 is attached to the support plate 34 as a result of the inserted metal of the holder 71 being attracted to the magnets 38A to 38F. The holder 71 may be configured by a non-magnetic metal and magnets may be provided at the upper surface of the holder 71. In this case, the support plate 34 may be configured by a magnetic metal.

The absorption fixture 7 may be attached to the support plate 34 by adhesion using a surface fastener, by tightening a screw, or the like, for example.

The absorption body 72 need not necessarily be provided over the whole of the lower surface of the holder 71. For example, the absorption body 72 may be disposed to any one, of the front, the rear, the right, and the left of the nozzle surfaces 57A, 57B, 58A, and 58B.

An end portion (the right end portion, for example) other than the left end 71A of the holder 71 may be covered by the absorption body 72A. The left end 71A of the holder 71 may be covered by a member other than the absorption body 72. The left end 71A of the holder 71 may be covered with an elastic material, such as rubber or the like.

The holder 71 may be provided with a protruding portion that protrudes from the front end toward the front or from the rear end toward the rear. The plate portions 236A and 236B may be provided with a recessed portion corresponding to the protruding portion. When disposing the absorption fixture 7 at the attachment position, the absorption fixture 7 may be attached to the support plate 34 by the protruding portion passing through the recessed portion.

The assistance members 23A and 23B may be provided on the carriage 30. In this case, so that there is no interference with the platen 12 positioned in the printing region 20R, it is preferable that the assistance members 23A and 23B be able to move between an assistance position, which is a position lower than the support plate 34, in which the assistance members 23A and 23B assist the attachment of the absorption fixture 7 to the support plate 34, and a retracted position that is higher than the support plate 34.

Figure 20:
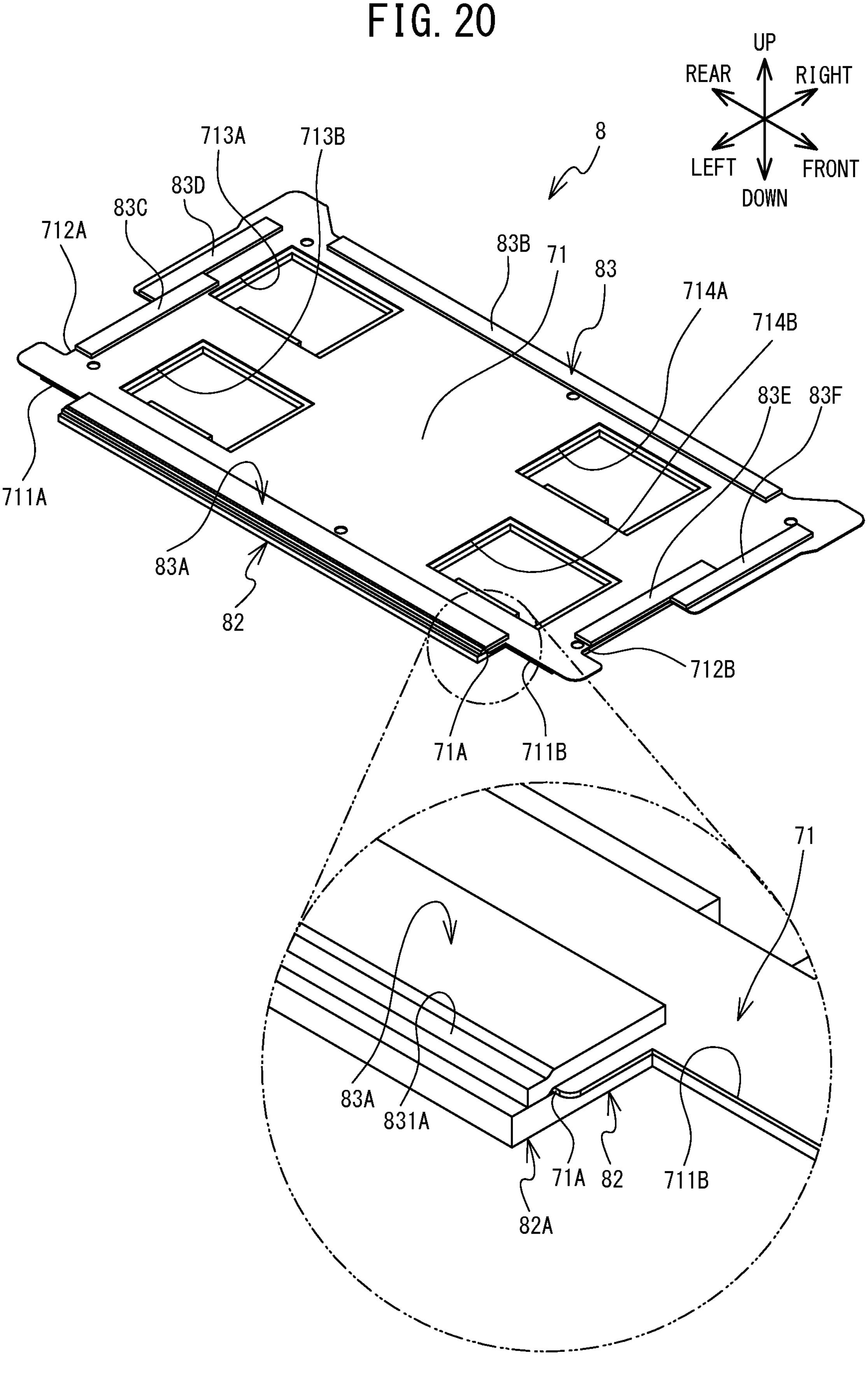
FIG. 20 is a perspective view of an absorption fixture according to a first modified example, as seen from the front and above.

An absorption fixture 8 will be described with reference to FIG. 20. The same reference signs will be assigned to a common configuration with the absorption fixture 7 (refer to FIG. 6) of the above-described embodiment, and a description thereof will be simplified or omitted. Portions different from the above-described embodiment will be mainly described.

The absorption fixture 8 is provided with absorption bodies 82 and 83. The absorption bodies 82 and 83 are configured by the same material as the absorption body 72, and have absorbent properties. The absorption body 82 differs from the absorption body 72 in that a part of the absorption body 82 is not folded over at the left end 71A of the holder 71.

The absorption body 83 is disposed on the upper surface of the holder 71. The absorption body 83 is provided with partial absorption bodies 83A, 83B, 83C, 83D, 83E, and 83F. The partial absorption body 83A is provided at the left end portion of the holder 71. The partial absorption body 83B is provided at the right end portion of the holder 71. The partial absorption bodies 83A and 83B extend in the front-rear direction. The partial absorption bodies 83C and 83D are provided at the rear end portion of the holder 71 and extend in the left-right direction. The partial absorption body 83C is provided further to the front than the notched portion 712A. The partial absorption body 83D is provided to the right of the notched portion 712A. The partial absorption bodies 83E and 83F are provided at the front end portion of the holder 71 and extend in the left-right direction. The partial absorption body 83E is provided further to the rear than the notched portion 712B. The partial absorption body 83F is provided further to the right than the notched portion 712B. The absorption fixture 8 absorbs droplets accumulated in a gap formed between the holder 71 and the support plate 34 (refer to FIG. 4), and suppresses the droplets from falling onto the print medium.

A left end portion 82A of the absorption body 82 and a left end portion 831A of the partial absorption body 83A are positioned further to the left than the left end 71A of the holder 71, and are adhered together. The left end 71A of the holder 71 is covered by the left end portions 82A and 831A. The left end portions 82A and 831A reduce the possibility of the left end 71A of the holder 71 coming into contact with the support plate 34, the nozzle surface 57A (refer to FIG. 4), and the like.

Figure 21:
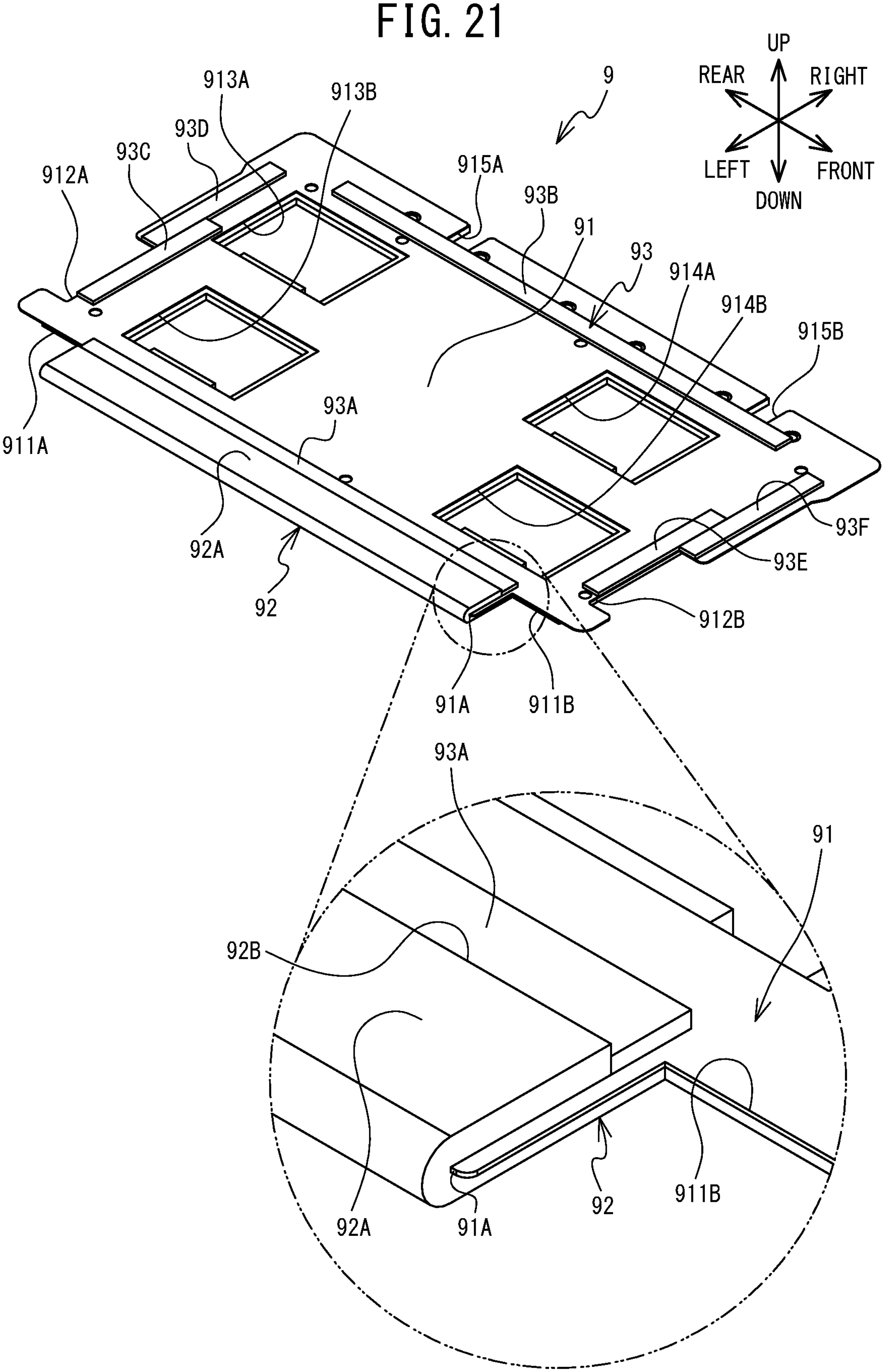
FIG. 21 is a perspective view of an absorption fixture according to a second modified example, as seen from the front and above.

An absorption fixture 9 will be described with reference to FIG. 21. The absorption fixture 9 is provided with a holder 91, and absorption bodies 92 and 93. Notched portions 911A, 911B, 912A, and 912B, and holes 913A, 913B, 914A, and 914B of the holder 91 respectively correspond to the notched portions 711A, 711B, 712A, and 712B, and the holes 713A, 713B, 714A, and 714B (refer to FIG. 6) of the holder 71. Notched portions 915A and 915B of the holder 91 are cut out from the right end of the holder 91 toward the left. The notched portion 915A is disposed to the rear of the notched portion 915B. In a state in which the absorption fixture 9 is directly attached to the support plate 34, the notched portions 915A and 915B reduce the possibility that the holder 91 may come into contact with the two positioners 34A (refer to FIG. 4).

The absorption body 92 is disposed on the holder 91. One part of the absorption body 92 is disposed on the lower surface of the holder 91. The absorption body 93 is disposed on the upper surface of the holder 91. Partial absorption bodies 93A, 93B, 93C, 93D, 93E, and 93F of the absorption body 93 have structures corresponding to those of the partial absorption bodies 83A, 83B, 83C, 83D, 83E, and 83F of the absorption body 83 (refer to FIG. 20). Other part of the absorption body 92 is folded over at a left end 91A of the holder 91. A folded over absorption body 92A is positioned at the upper surface of the holder 91.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer comprising:
a platen on which a print medium is placed;
a head including a nozzle surface and configured to discharge ink, in a discharge direction, from the nozzle surface;
a support plate configured to support the head; and
an absorption body provided on the support plate, the absorption body being positioned on the discharge direction to the support plate, the absorption body being exposed to the platen in the discharge direction, and the absorption body being configured to absorb liquid.

2. The printer according to claim 1, wherein
the nozzle surface is positioned further to the discharge direction than the support plate, and
the absorption body is positioned, in the discharge direction, between the support plate and the nozzle surface.

3. The printer according to claim 2, wherein
in a state of having absorbed the liquid, the absorption body is positioned, in the discharge direction, between the support plate and the nozzle surface.

4. The printer according to claim 2, further comprising:
a wiper configured to wipe the nozzle surface, wherein
the absorption body is positioned further than the wiper to an opposite direction to the discharge direction.

5. The printer according to claim 4, wherein
the absorption body is provided on at least one of a wiping direction or an opposite direction to the wiping direction in which the nozzle surface is wiped by the wiper, the wiping direction intersecting the discharge direction.

6. The printer according to claim 1, wherein
the platen moves in a sub-scanning direction relative to the nozzle surface, and
the absorption body is provided on the sub-scanning direction with respect to the nozzle surface.

7. The printer according to claim 1, wherein
the absorption body is provided to be replaceable with respect to the support plate.

8. The printer according to claim 7, further comprising:
a holder configured to hold the absorption body, wherein
a magnet is provided on one of the holder or the support plate, and
the other of the holder or the support plate includes an attraction portion attracted to the magnet.

9. The printer according to claim 8, further comprising:
an escape member configured to cause the liquid to escape from at least one of the absorption body or the holder, in a region other than a printing region of a region inside the printer, the printing region being a region in which the head discharges the ink onto the print medium placed on the platen.

10. The printer according to claim 9, further comprising:
a cap configured to contact with the nozzle surface, wherein
the escape member is disposed in a gap between the absorption body and the nozzle surface in a state that the cap is contacted with the nozzle surface.

11. The printer according to claim 7, wherein
the support plate includes a positioner configured to determine a position, in a main scanning direction or a sub-scanning direction in which the platen moves relative to the nozzle surface, of the absorption body with respect to the support plate.

12. The printer according to claim 7, further comprising:
a guide portion configured to guide the absorption body to an attachment position for attaching the absorption body to the support plate; and
a restriction portion configured to restrict the absorption body from being attached to the support plate at a position different from the attachment position.

13. The printer according to claim 1, further comprising:
a holder configured to hold the absorption body; and
an escape member configured to cause the liquid to escape from at least one of the absorption body or the holder, in a region other than a printing region of a region inside the printer, the printing region being a region in which the head discharges the ink onto the print medium placed on the platen.

14. An absorption body provided in a printer including a platen on which a print medium is placed, a head that includes a nozzle surface and that discharges ink in a discharge direction from the nozzle surface, and a support plate that supports the head, wherein
the absorption body is provided on the support plate, the absorption body is positioned on the discharge direction to the support plate, the absorption body is exposed to the platen in the discharge direction, and the absorption body is configured to absorb liquid.

15. The absorption body according to claim 14, wherein
the absorption body is held by a holder that is replaceable with respect to the support plate.

16. The absorption body according to claim 15, further comprising:
an intermediate member that is provided at part of an end of the holder, and is different from the holder.

17. The absorption body according to claim 16, wherein
the intermediate member is a part of the absorption body.

* * * * *